US012707473B2

(12) United States Patent
Pan et al.

(10) Patent No.: US 12,707,473 B2
(45) Date of Patent: Aug. 11, 2026

(54) CAST TYPE AND COORDINATION BASED INTER-UE OPERATION FOR NR SIDELINK

(71) Applicant: INTERDIGITAL PATENT HOLDINGS, INC., Wilmington, DE (US)

(72) Inventors: Kyle Pan, Saint James, NY (US); Guodong Zhang, Woodbury, NY (US); Patrick Svedman, Stockholm (SE); Pascal Adjakple, Great Neck, NY (US); Yifan Li, Conshohocken, PA (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 536 days.

(21) Appl. No.: 18/250,080

(22) PCT Filed: Oct. 20, 2021

(86) PCT No.: PCT/US2021/055815
§ 371 (c)(1),
(2) Date: Apr. 21, 2023

(87) PCT Pub. No.: WO2022/087111
PCT Pub. Date: Apr. 28, 2022

(65) Prior Publication Data

US 2024/0015755 A1 Jan. 11, 2024

Related U.S. Application Data

(60) Provisional application No. 63/094,606, filed on Oct. 21, 2020.

(51) Int. Cl.
*H04W 72/23* (2023.01)
*H04W 8/00* (2009.01)
(Continued)

(52) U.S. Cl.
CPC ........... *H04W 72/23* (2023.01); *H04W 8/005* (2013.01); *H04W 72/25* (2023.01); *H04W 74/04* (2013.01)

(58) Field of Classification Search
CPC ..... H04W 72/23; H04W 72/25; H04W 8/005; H04W 74/04
See application file for complete search history.

(56) References Cited

U.S. PATENT DOCUMENTS

2018/0206260 A1* 7/2018 Khoryaev ............. H04W 72/56
2019/0045345 A1* 2/2019 Lee ....................... H04L 1/1812
(Continued)

OTHER PUBLICATIONS

3GPP TR 22.886 Study on enhancement of 3GPP Support for 5G V2X Services, Release 16, V16.2.0, 2018, 76 pages.
(Continued)

*Primary Examiner* — Jael M Ulysse
(74) *Attorney, Agent, or Firm* — Flaster Greenberg P.C.

(57) ABSTRACT

The present application describes an apparatus including a non-transitory memory including instructions stored thereon. The apparatus also includes a processor operably coupled to the non-transitory memory configured to execute a set of instructions. The instructions include sensing plural devices in a group to provide sidelink coordination. The instructions also include evaluating a coordination type of each of the plural devices, where the coordination type is scheduled and/or assisted. The instructions also include obtaining transmission and reception resources for the plural devices. The instruction further include determining the transmission and reception resources are dedicated or shared among the plural devices based on the coordination type. The instructions even further include determining a signaling type for each of the plural devices based on the coordination type.

18 Claims, 27 Drawing Sheets

(51) Int. Cl.
*H04W 72/25* (2023.01)
*H04W 74/04* (2009.01)

(56) References Cited

U.S. PATENT DOCUMENTS

| | | | | |
|---|---|---|---|---|
| 2019/0090218 | A1* | 3/2019 | Noh | H04W 88/06 |
| 2020/0163005 | A1* | 5/2020 | Rao | H04W 4/44 |
| 2020/0374859 | A1* | 11/2020 | Han | H04W 72/02 |
| 2021/0045074 | A1* | 2/2021 | Manolakos | H04L 5/0057 |
| 2021/0045093 | A1* | 2/2021 | Rao | H04W 76/14 |
| 2021/0051600 | A1* | 2/2021 | Fakoorian | H04W 72/21 |
| 2021/0059005 | A1* | 2/2021 | Hosseini | H04W 76/28 |
| 2021/0112582 | A1* | 4/2021 | Lee | H04W 72/535 |
| 2021/0227621 | A1* | 7/2021 | Pan | H04W 72/0446 |
| 2021/0315005 | A1* | 10/2021 | Choe | H04W 74/0833 |
| 2022/0030575 | A1* | 1/2022 | Farag | H04W 76/14 |
| 2022/0046594 | A1* | 2/2022 | Lee | H04W 72/02 |
| 2022/0046660 | A1* | 2/2022 | Huang | H04L 5/0037 |
| 2022/0046746 | A1* | 2/2022 | Yang | H04W 72/0446 |
| 2022/0086803 | A1* | 3/2022 | Li | H04W 72/0453 |
| 2022/0095280 | A1* | 3/2022 | Farag | H04L 1/1671 |
| 2022/0095369 | A1* | 3/2022 | Xue | H04L 5/001 |
| 2022/0104180 | A1* | 3/2022 | Yang | H04L 5/005 |
| 2022/0132603 | A1* | 4/2022 | Adjakple | H04W 4/40 |
| 2023/0276474 | A1* | 8/2023 | Mohammad Soleymani | H04W 72/02 370/329 |
| 2023/0300858 | A1* | 9/2023 | Zhou | H04W 72/25 370/329 |
| 2023/0309134 | A1* | 9/2023 | Leon Calvo | H04W 72/563 |
| 2023/0379886 | A1* | 11/2023 | Wang | H04W 4/023 |
| 2024/0163874 | A1* | 5/2024 | Farag | H04W 76/14 |

OTHER PUBLICATIONS

3GPP TS 22.186 Enhancement of 3GPP support for V2X scenarios (Stage 1), Release 16, V16.2.0, 2019, 18 pages.

Asustek: "Discussion on V2X mode 2 enhancements", 3GPP Draft; RI-2008499, 3rd Generation Partnership Project (3GPP), Mobile Competence Centre ; 650, Route Des Lucioles ; F-06921 Sophia-Antipolis Cedex ; France vol. RAN WG1, No. e-Meeting; Oct. 26, 2020-Nov. 13, 2020 , Oct. 16, 2020, 2 Pages.

Convida Wireless, "On Resource Allocation Mode 2 Enhancement for NR Sidelink", 3GPP Draft; RI-2006922, 3rd Generation Partnership Project (3GPP), Mobile Competence Centre; 650, Route Des Lucioles ; F-06921 Sophia-Antipolis Cedex ; France vol. RAN WG1, No. e-Meeting; Aug. 17, 2020-Aug. 28, 2020, Aug. 8, 2020, 3 Pages.

Huawei et al.,"Inter-OE coordination in sidelink resource allocation" 3GPP Draft; R1-2005255, 3rd Generation Partnership Project (3GPP), Mobile Competence Centre ; 650, Route Des Lucioles ; F-06921 Sophia-Antipolis Cedex France , vol. RAN WGI, No. E-meeting; Aug. 17, 2020-Aug. 28, 2020, Aug. 8, 2020, 9 Pages.

KDDI Corporation, "Discussion on sidelink resource allocation", 3GPP Draft; R1-1813058_V2V_RA_R4, 3rd Generation Partnership Project (3GPP), Mobile Competence Centre ; 650, Route Des Lucioles ; F-06921 Sophia-Antipolis Cedex ; France vol. RAN WG1, No. Spokane, USA; Nov. 12, 2018-Nov. 16, 2018, Nov. 11, 2018, 7 Pages.

Robert Bosch GMBH: "Sidelink Resource Allocation Enhancements", 3GPP Draft; RI-2006876, 3rd Generation Partnership Project (3GPP), Mobile Competence Centre; 650, Route Des Lucioles ; F-06921 Sophia-Antipolis Cedex ; France vol. RAN WGI, No. E-Meeting; Aug. 17, 2020-Aug. 28, 2020, Aug. 7, 2020, 5 Pages.

* cited by examiner

FIG. 12
Determine Coordination Signaling Type
Determine Assistance Info Type (if Coordination Signaling Incl Assistance Info)
Determine How Many Assistance Info
Determine Payload Size Based on Coordination Signaling and/or Assistance Info Types and Numbers
Payload Size > Threshold ?
Yes
No
Split Info Based on Priority
Info's Priority High, Medium or Low?
High
Medium
Low
Carry Coordination Signaling and/or Assistance Info in 1st Stage SCI
Carry Coordination Signaling and/or Assistance Info in 2nd Stage SCI
Carry Coordination Signaling and/or Assistance Info in SL-SCH

CAST TYPE AND COORDINATION BASED INTER-UE OPERATION FOR NR SIDELINK

CROSS-REFERENCE TO RELATED APPLICATIONS

The instant application is the National Stage Application of International Patent Application No. PCT/US2021/055815, filed Oct. 20, 2021, which claims the benefit of priority of U.S. Provisional Application No. 63/094,606 filed Oct. 21, 2020, entitled, "Cast Type and Coordination Based Inter-UE Operation For Nr Sidelink," the content of which is incorporated by reference herein.

FIELD

The present application is directed to methods and systems for cast type and coordination based inter-user equipment (UE) operation for new radio (NR) Sidelink.

BACKGROUND

Presently, one node may be used to concurrently coordinate one or more UEs in a centralized system. However, support for Sidelink (SL) based scheduling in a coordinated manner is limited. What is desired in the art are techniques and architectures supporting inter-UE operation for SL-based scheduling.

When operating in mixed type coordination in which one UE may coordinate multiple UEs with some UEs being scheduled and other UEs being assisted, a mechanism to support and enable mixed type coordination should also be designed.

Multi-type coordination may include a UE receiving more than one type of coordination signaling. Coordination signaling may include scheduling type information and assistance type information. What is desired in the art are techniques and architectures for handling multi-type coordination to enable higher reliability and lower latency for resource allocation.

What is also desired in the art is improved coordination techniques for power consumption reduction and/or power saving. Generally, sensing and resource (re-)selection in NR SL systems may not include coordination signaling. What is further desired in the art are techniques and architectures supporting coordination of information to enhance sensing and/or resource (re-)selection.

SUMMARY

This summary is provided to introduce a selection of concepts in a simplified form that is further described below in the Detailed Description. This Summary is not intended to limit the scope of the claimed subject matter. The foregoing needs are met, to a great extent, by the present application described herein, with aspects of the application are at least directed to the following aspects.

One aspect of the application describes an apparatus including a non-transitory memory including instructions stored thereon. The apparatus also includes a processor operably coupled to the non-transitory memory configured to execute a set of instructions. The instructions include sensing plural devices in a group to provide sidelink coordination. The instructions also include evaluating a coordination type of each of the plural devices, where the coordination type is scheduled and/or assisted. The instructions also include obtaining transmission and reception resources for the plural devices. The instruction further include determining the transmission and reception resources are dedicated or shared among the plural devices based on the coordination type. The instructions even further include determining a signaling type for each of the plural devices based on the coordination type.

Another aspect of the application describes a method including a step of evaluating a coordination type of plural devices. The coordination type is scheduled for one of the plural devices and the coordination type is assisted for another one of the plural devices. The method also includes a step of obtaining transmission and reception resources for the plural devices. The method further includes a step of determining the transmission and reception resources are dedicated or shared among the plural devices based on the coordination type.

Even another aspect of the application describes an apparatus including a non-transitory memory including instructions stored thereon. The apparatus also includes a processor operably coupled to the non-transitory memory configured to execute a set of instructions. The instructions include receiving, from a device, assistance information for sidelink coordination. The instructions also include determining transmission and reception resources in the received assistance information. The instructions even also include measuring energy of a physical sidelink shared channel (PSSCH) energy of the apparatus and user equipment. The instructions further include selecting, based on the determined transmission and reception resources and the measured PSSCH energy of the apparatus and the user equipment, a candidate resource set. The instructions yet even further include transmitting, to the device, a selection resource set based upon the candidate resource set.

BRIEF DESCRIPTION OF THE DRAWINGS

In order to facilitate a more robust understanding of the application, reference is now made to the accompanying drawings in which like elements are referenced with like numerals. These drawings should not be construed to limit the application and are intended only to be illustrative.

DETAILED DESCRIPTION OF THE ILLUSTRATIVE EMBODIMENTS

Figure 1A:
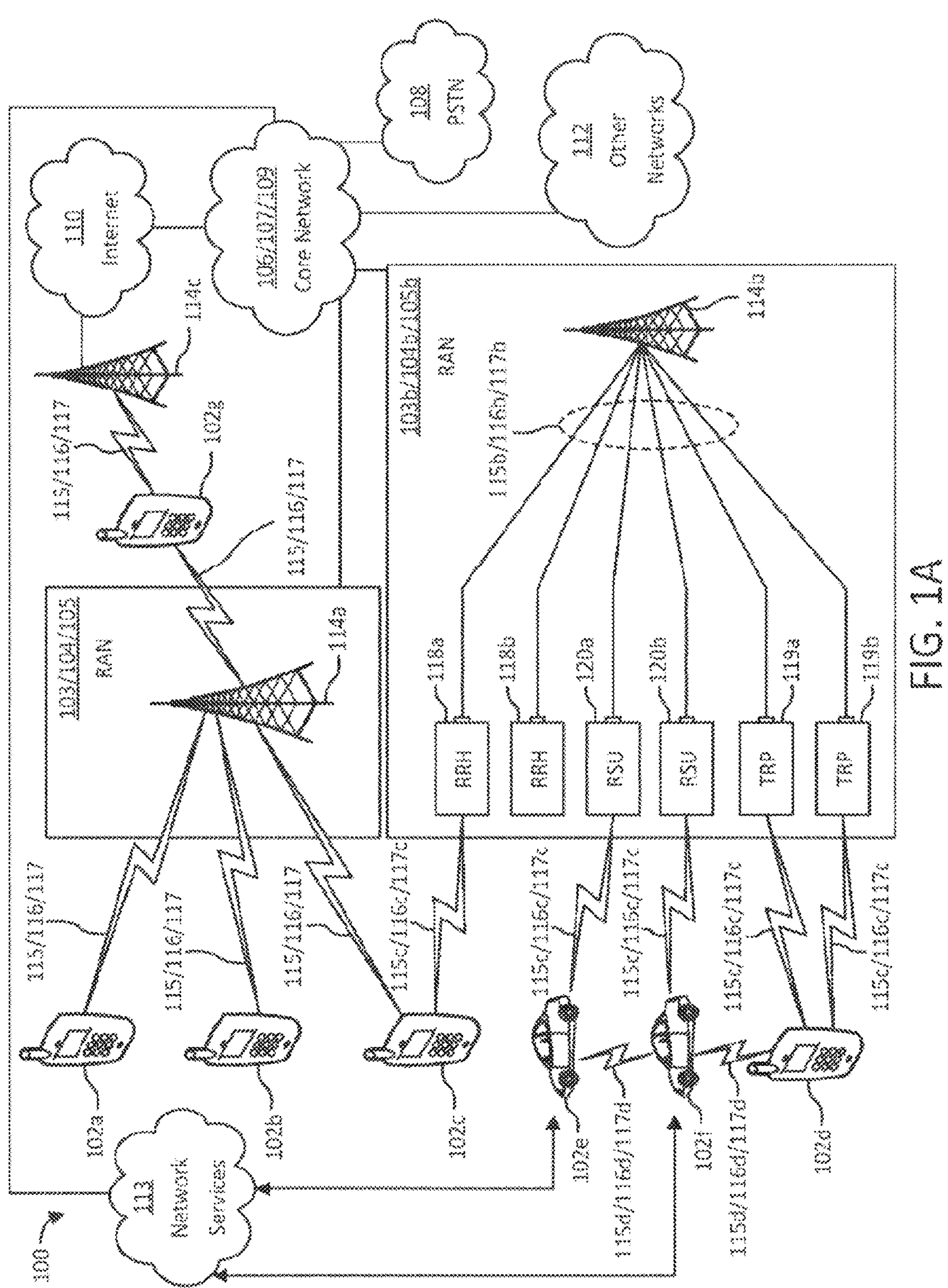
FIG. 1A illustrates an exemplary communications system according to an aspect of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," or the like means that a particular feature, structure or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other. Reference in this specification to "one aspect," "an aspect," "one or more aspects," or the like encompasses one or more embodiments listed thereunder.

Definitions/Acronyms

Provided below are definitions for terms and phrases commonly used in this application in Table 1 below.

TABLE 1

| Acronym | Term or Phrase |
|---|---|
| ACK | ACKnowledgement |
| BWP | Bandwidth Part |
| CC | Component Carrier |
| CCG | Component Carrier Group |
| CE | Control Element |
| CRC | Cyclic Redundancy Check |
| DCI | Downlink Control Information |
| HARQ | Hybrid Automatic Repeat Request |
| IE | Information Element |
| LTE | Long Term Evolution |
| MAC | Medium Access Control |
| NACK | Non-ACKnowledgement |
| NR | New Radio |
| PSCCH | Physical Sidelink Control Channel |
| PSSCH | Physical Sidelink Shared Channel |
| RAN | Radio Access Network |
| RB | Resource Block |
| RBG | Resource Block Group |
| RNTI | Radio Network Temporary Identifier |
| RRC | Radio Resource Control |
| SCI | Sidelink Control Information |
| SFI | Slot Format Indicator |
| SI | System Information |
| SL | Sidelink |
| UE | User Equipment |
| V2V | Vehicle-to-Vehicle |
| V2X | Vehicle-to-everything |

General Architecture

The 3rd Generation Partnership Project (3GPP) develops technical standards for cellular telecommunications network technologies, including radio access, the core transport network and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive recall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or can be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane and the like.

The communications system 100 may also include a base station 114*a* and a base station 114*b*. In the example of FIG. 1A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to a wired and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a* and 119*b* may be any type of device configured to wirelessly interface with at least one of the WTRU 102*d*'s, to facilitate access to one or more communication networks, such as the core network 106/107/109, the Internet 110, Network Services 113, and/or other networks 112. RSUs 120*a* and 120*b* may be any type of device configured to wirelessly interface with at least either the WTRU 102*e* or 102*f*, to facilitate access to one or more communication networks, such as the core network 106/107/109, the Internet 110, other networks 112, and/or Network Services 113. By way of example, the base stations 114*a* and 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 1A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links. For example, the WTRU 102*g* shown in FIG. 1A may be configured to communicate with the base station 114*a*, which may employ a cellular-based radio technology, and with the base station 114*c*, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117, and 115*c*/116*c*/117*c* may equally apply to a wired connection.

Figure 1B:
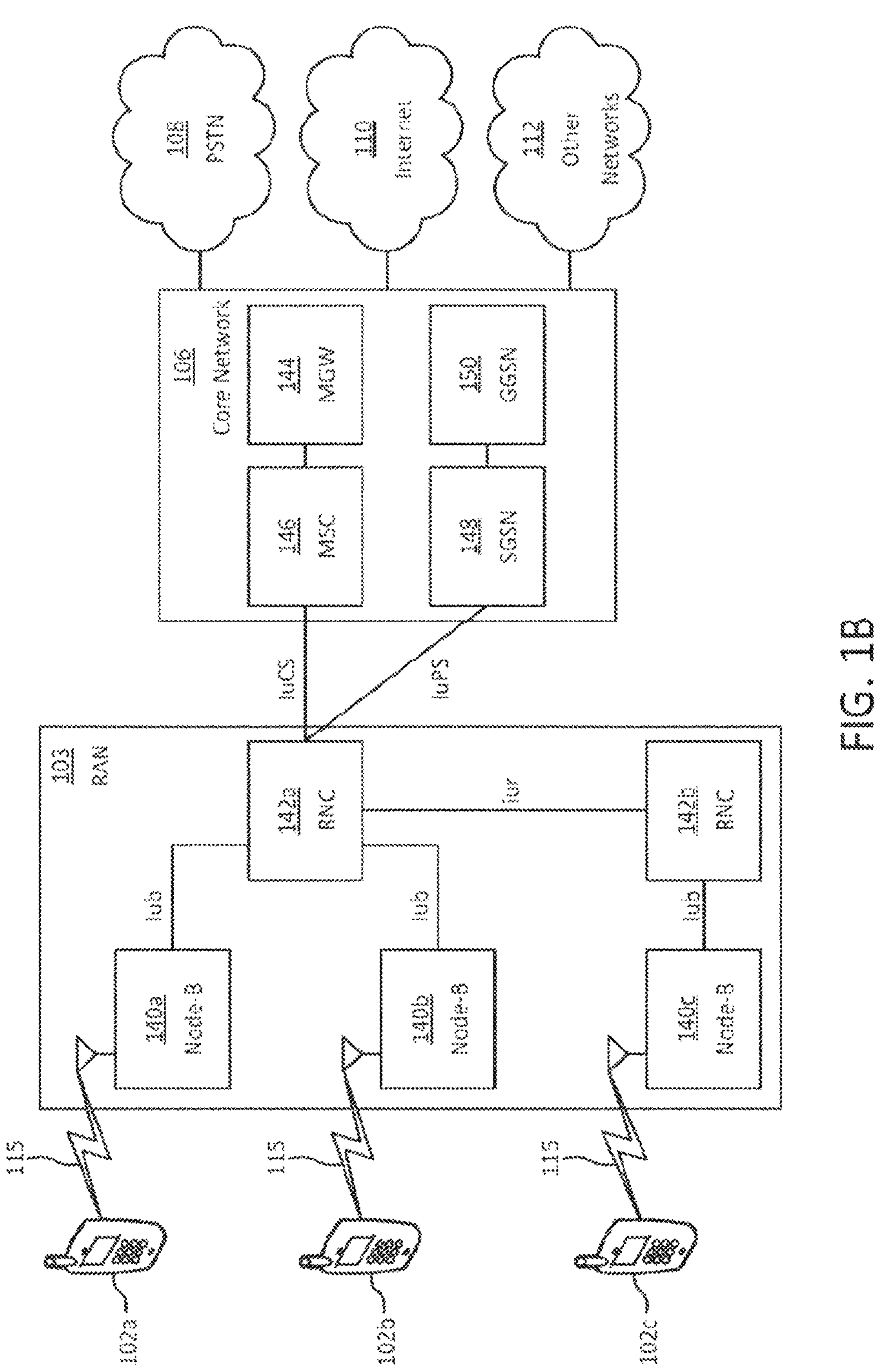
FIG. 1B illustrates an exemplary apparatus configured for wireless communication according to an aspect of the application.

FIG. 1B is a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 1B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 1B, the Node-Bs 140*a* and 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned and/or operated by other service providers.

Figure 1C:
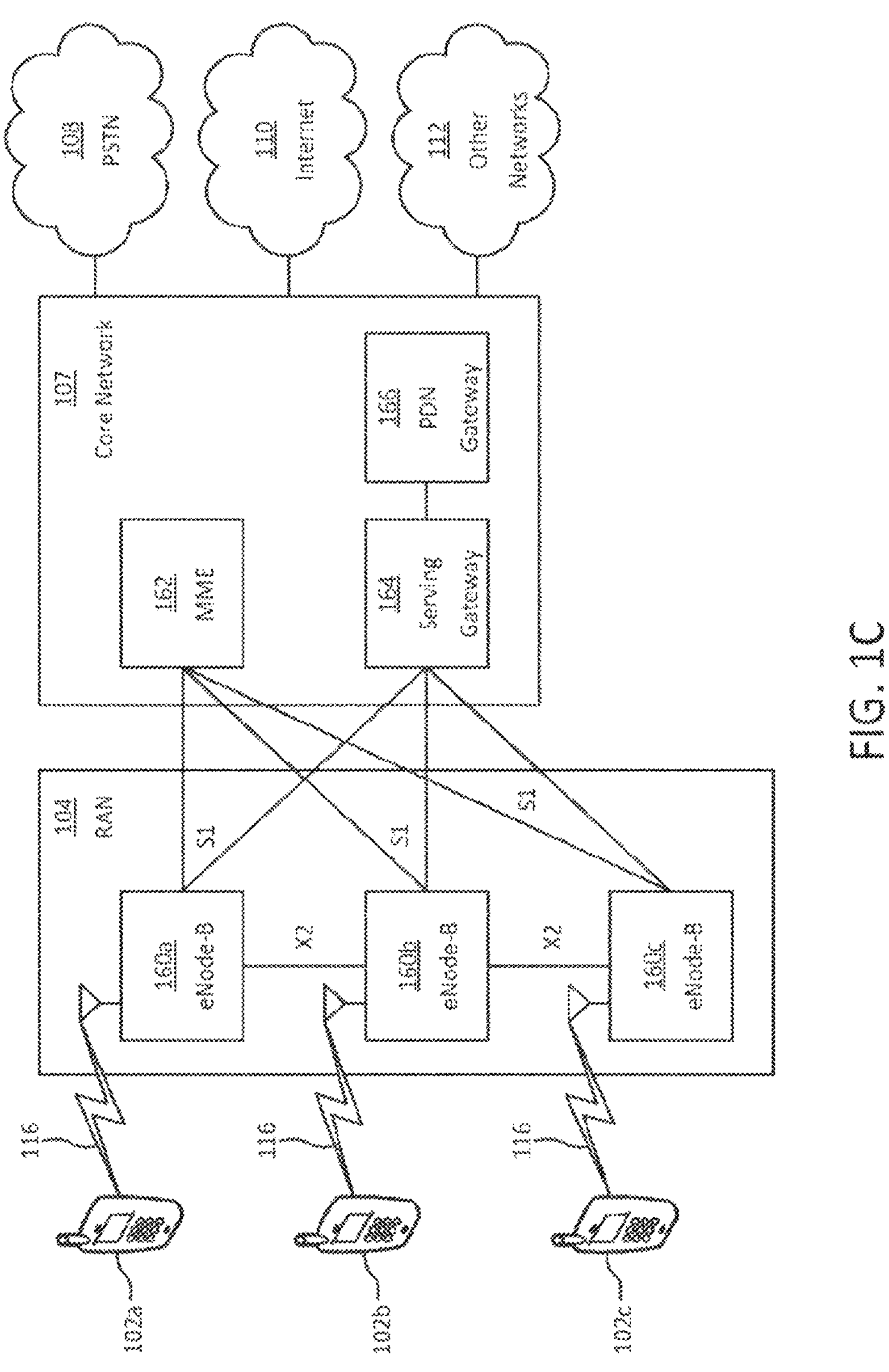
FIG. 1C illustrates a system diagram of a radio access network and a core network according to an aspect of the application.

FIG. 1C is a system diagram of an example RAN 104 and core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 1C, the eNode-Bs 160*a*, 160*b*, and 160*c* may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned and/or operated by other service providers.

Figure 1D:
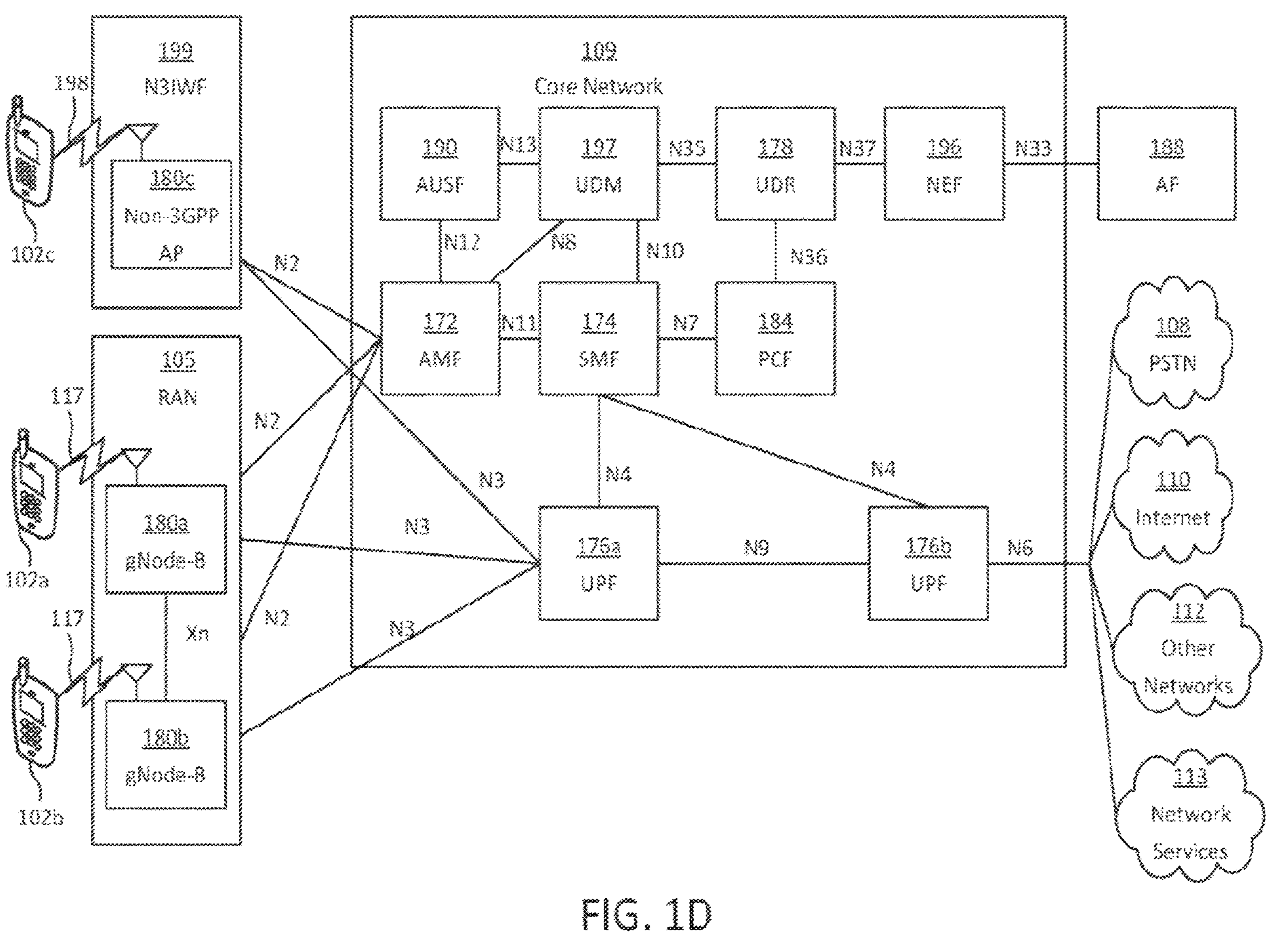
FIG. 1D illustrates a system diagram of a radio access network and a core network according to an aspect of the application.

FIG. 1D is a system diagram of an example RAN 105 and core network 109. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU

102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 1D, the gNode-Bs 180*a* and 180*b* may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, it may consist of additional elements, and may also consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, or access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function may add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance, and isolation.

3GPP has designed the 5G core network to support Network Slicing. Network Slicing is a good tool that network operators may use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
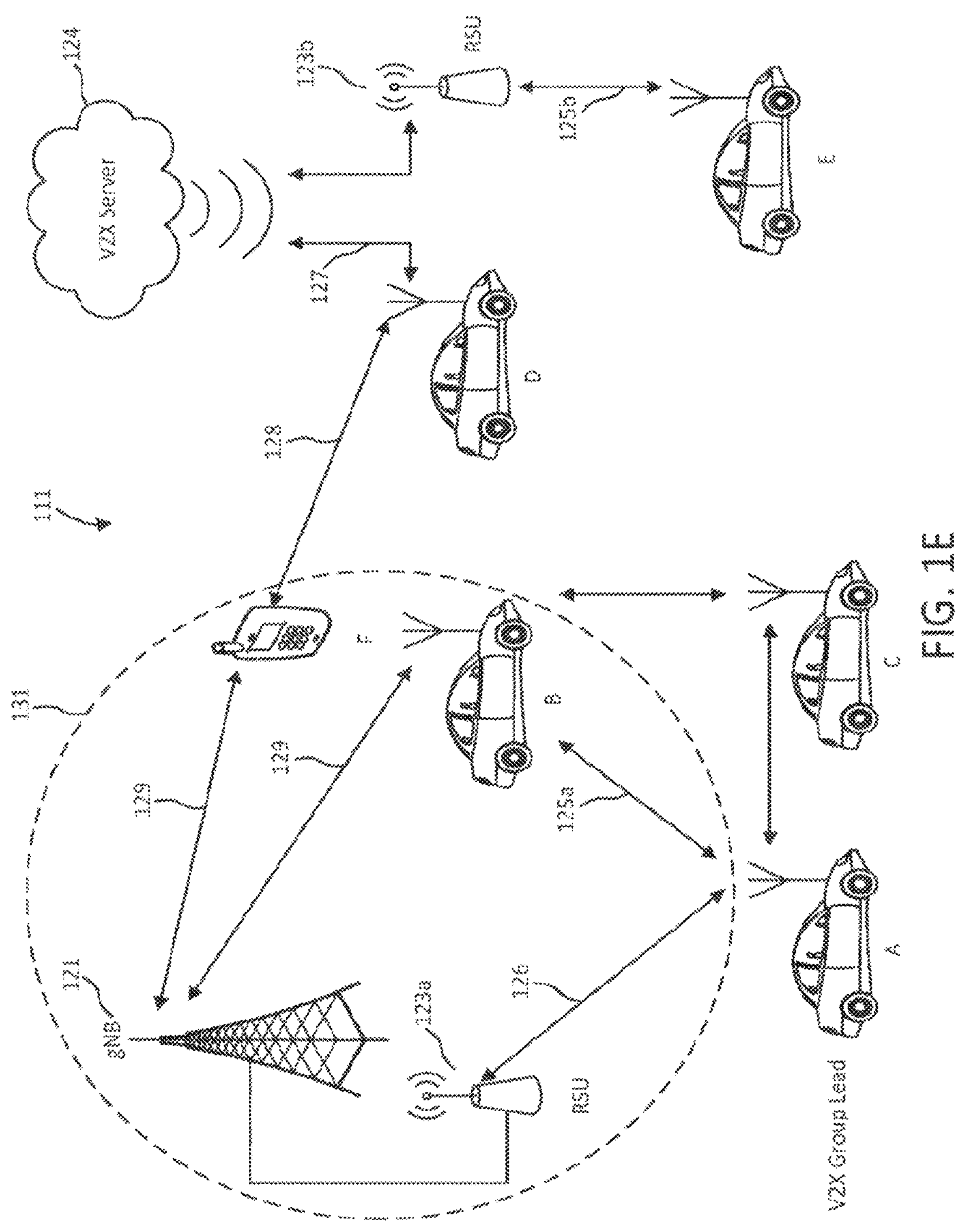
FIG. 1E illustrates a system diagram of a radio access network and a core network according to an aspect of the application.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
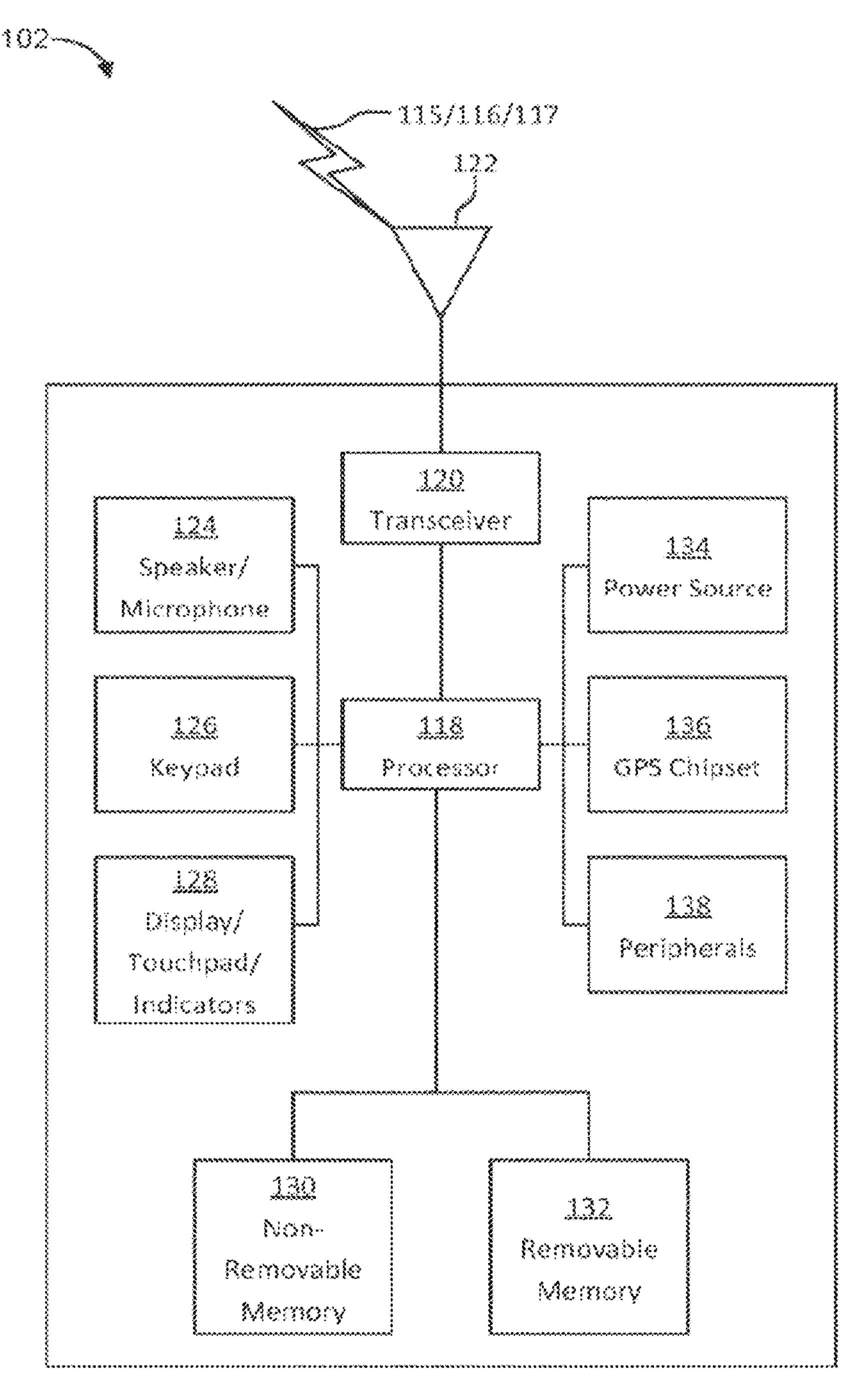
FIG. 1F illustrates a block diagram of an exemplary computing system in communication with one or more networks previously shown in FIGS. 1A, 1C, 1D, and 1E according to an aspect of the application.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 1A) over the air interface 115/116/117 or another UE over the air interface 115*d*/116*d*/117*d*. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
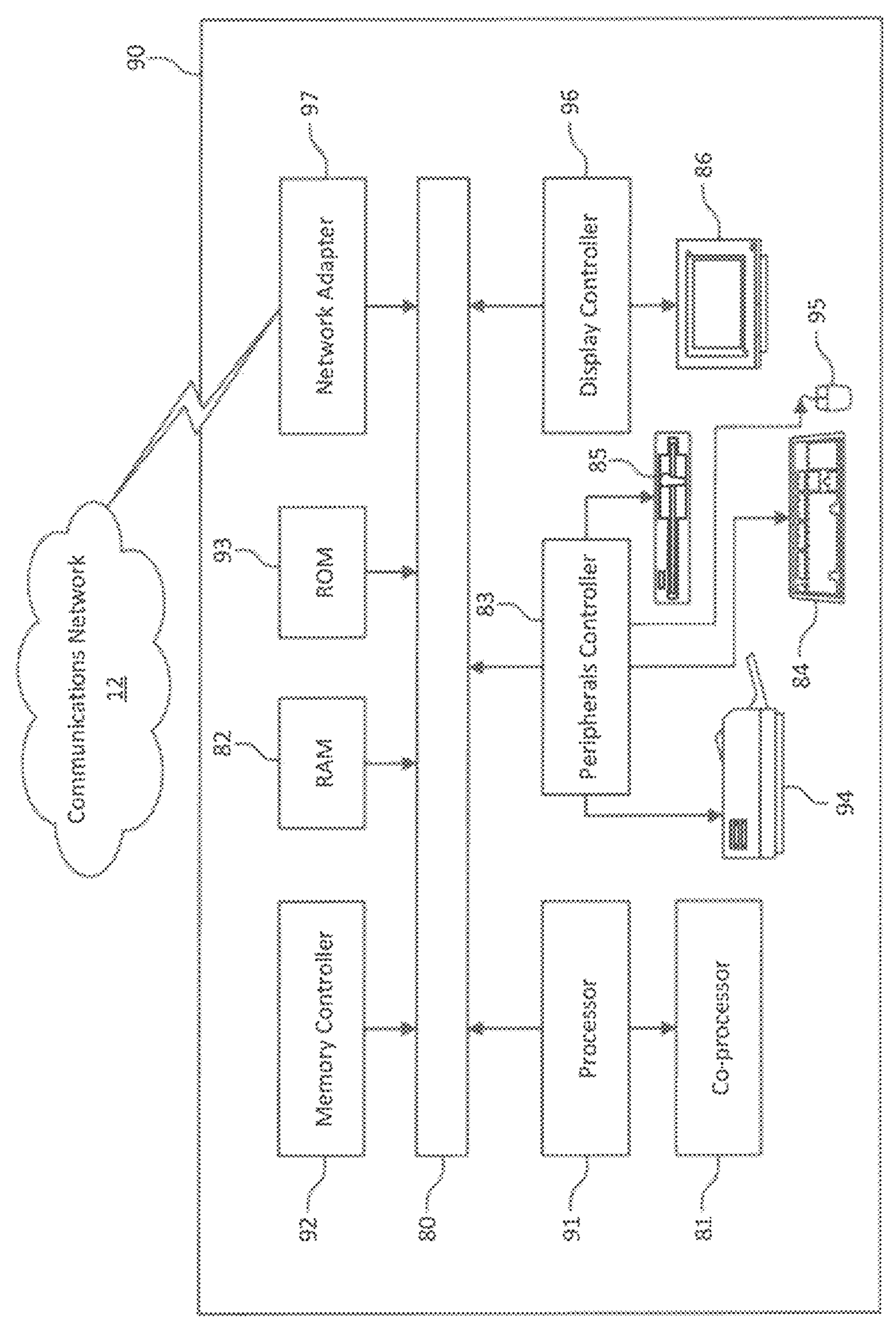
FIG. 1G illustrates an exemplary communications system according to an aspect of the application.

FIG. 1G is a block diagram of an exemplary computing system 90 in which one or more apparatuses of the communications networks illustrated in FIGS. 1A, 1C, 1D, and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that may not easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it may not access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Furthermore, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

NR V2X Requirements

NR V2X is designed with a broader set of more advanced V2X use cases in mind and are broadly arranged into four use case groups: vehicular platooning, extended sensors, advanced driving, and remote driving.

Vehicles platooning enables vehicles to dynamically form a platoon travelling together. All the vehicles in the platoon obtain information from the leading vehicle to manage this platoon. The information allows the vehicles to drive closer than normal in a coordinated manner and going to the same direction and travelling together.

Extended sensors enable the exchange of raw or processed data gathered through local sensors or live video images among vehicles, road site units, devices of pedestrians, and V2X application servers. The vehicles may increase the perception of their environment beyond of what their own sensors may detect and have a more broad and holistic view of the local situation. High data rate is one of the key characteristics.

Advanced driving enables semi-automated or fully-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity.

Remote driving enables a remote driver or a V2X application to operate a remote vehicle for those passengers who may not drive by themselves or remote vehicles located in dangerous environments. In instances where variation is limited and routes are predictable, such as public transportation, driving based on cloud computing may be used. High reliability and low latency are some of the main requirements.

The most demanding requirements are for a maximum sidelink range of 1000m, a maximum throughput of 1 Gbps, a shortest latency of 3 ms, a maximum reliability of 99.999%, and a maximum transmission rate of 100 messages/second. There are also requirements relating to security, integrity, authorization, and privacy.

NR V2X

NR V2X has physical layer support for broadcast, unicast, and groupcast sidelink operations. The addition of unicast and groupcast is linked with the introduction of Sidelink HARQ feedback, high order modulation, Sidelink CSI, and PC5-RRC, etc.

The NR V2X Sidelink uses the following physical channels: Physical Sidelink broadcast channel (PSBCH) and its DMRS; Physical Sidelink control channel (PSCCH) and its DMRS; Physical Sidelink shared channel (PSSCH) and its DMRS; and Physical Sidelink feedback channel (PSFCH).

The NR V2X also includes the following signals: Sidelink primary and secondary synchronization signals (S-PSS and S-SSS) organized into the Sidelink synchronization signal block (S-SSB) together with PSBCH. S-PSS and S-SSS may be referred to jointly as the Sidelink synchronization signal (SLSS); Phase-tracking reference signal (PT-RS) in FR2; and Channel state information reference signal (CSI-RS).

NR-V2X Sidelink supports subcarrier spacings of 15, 30, 60, and 120 kHz. Their associations to CPs and frequency ranges are as for NR UL/DL but using only the CP—OFDM waveform. The modulation schemes available are QPSK, 16-QAM, 64-QAM, and 256-QAM.

PSBCH transmits the SL-BCH transport channel, which carries the Sidelink V2X Master Information Block (MIB-V2X) from the RRC layer. When in use, PSBCH transmits MIB-V2X every 160 ms in 11 RBs of the SL bandwidth, with possible repetitions in the period. DMRS associated with PSBCH are transmitted in every symbol of the S-SSB slot. S-PSS and S-SSS are transmitted together with PSBCH in the S-SSB. They jointly convey the SLSS ID used by the UE.

Sidelink control information (SCI) in NR V2X is transmitted in two stages. The first stage SCI is carried on PSCCH and contains information to enable sensing operations, as well as information about the resource allocation of the PSSCH.

PSSCH transmits the second-stage SCI and the SL-SCH transport channel. The second-stage SCI carries information needed to identify and decode the associated SL-SCH, as well as control for HARQ procedures, and triggers for CSI feedback, etc. SL-SCH carries the TB of data for transmission over SL.

The resources in which PSSCH is transmitted may be scheduled or configured by a gNB or determined through a sensing procedure conducted autonomously by the transmitting UE. A given TB may be transmitted multiple times. DMRS associated with rank-1 or rank-2 PSSCH may be transmitted in 2, 3, or 4 sidelink symbols distributed through a sidelink slot. Multiplexing between PSCCH and PSSCH is in time and frequency within a slot.

PSFCH carries HARQ feedback over the sidelink from a UE which is an intended recipient of a PSSCH transmission (e.g., Rx UE) to the UE which performed the transmission (e.g., Tx UE). Sidelink HARQ feedback may be in the form of conventional ACK/NACK, or NACK-only with nothing transmitted in case of successful decoding. PSFCH transmits a Zadoff-Chu sequence in one PRB repeated over two OFDM symbols, the first of which may be used for AGC, near the end of the sidelink resource in a slot. The time resources for PSFCH are pre-configured to occur once in every 1, 2, or 4 slots.

Resource Allocation Modes

Mode 1 may be for resource allocation by a gNB. The use cases intended for NR V2X may generate a diverse array of periodic and aperiodic message types. Therefore, resource allocation mode 1 provides dynamic grants of sidelink resources from a gNB, as well as grants of periodic sidelink resources configured semi-statically by RRC.

A dynamic sidelink grant DCI may provide resources for one or multiple transmissions of a transport block, in order to allow control of reliability. The transmission(s) may be subject to the sidelink HARQ procedure, if that operation is enabled.

A Sidelink configured grant may be such that it is configured once and may be used by the UE immediately, until it is released by RRC signaling (known as Type 1). A UE is allowed to continue using this type of sidelink configured grant when beam failure or physical layer problems occur in NR Uu until a RLF detection timer expires, before falling back to an exception resource pool. The other type of sidelink configured grant, known as Type 2, is configured once but may not be used until the gNB sends the UE a DCI indicating it is now active, and only until another DCI indicates de-activation. The resources in both types are a set of sidelink resources recurring with a periodicity which a gNB will desire to match to the characteristics of the V2X traffic. Multiple configured grants may be configured, to allow provision for different services, traffic types, etc.

MCS information for dynamic and configured grants may optionally be provided or constrained by RRC signaling instead of the traditional DCI. RRC may configure the exact MCS the Tx UE uses, or a range of MCS. It may also be left unconfigured. For the cases where RRC does not provide the exact MCS, the transmitting UE is left to select an appropriate MCS itself based on the knowledge it has of the TB to be transmitted and, potentially, the sidelink radio conditions.

Mode 2 may be for UE autonomous resource selection. Its basic structure is of a UE sensing, within a (pre-)configured resource pool, where resources are not in use by other UEs with higher-priority traffic and may choose an appropriate amount of such resources for its own transmissions. Having selected such resources, the UE may transmit and re-transmit in them a certain number of times, or until a cause of resource reselection is triggered.

The mode 2 sensing procedure may select and then reserve resources for a variety of purposes reflecting that NR V2X introduces Sidelink HARQ in support of unicast and groupcast in the physical layer. It may reserve resources to be used for a number of blind (re-)transmissions or HARQ-feedback-based (re-)transmissions of a transport block, in which case the resources are indicated in the SCI(s) scheduling the transport block. Alternatively, it may select resources to be used for the initial transmission of a later transport block, in which case the resources are indicated in an SCI scheduling a current transport block. Finally, an initial transmission of a transport block may be performed after sensing and resource selection, but without a reservation.

The first-stage SCIs transmitted by UEs on PSCCH indicate the time-frequency resources in which the UE will transmit a PSSCH. These SCI transmissions are used by sensing UEs to maintain a record of which resources have been reserved by other UEs in the recent past.

The sensing UE then selects resources for its (re-)transmission(s) from within a resource selection window. The window starts shortly after the trigger for (re-)selection of resources and may not be longer than the remaining latency budget of the packet due to be transmitted. Reserved resources in the selection window with SL-RSRP above a threshold are excluded from being candidates by the sensing UE, with the threshold set according to the priorities of the traffic of the sensing and transmitting UEs. Thus, a higher priority transmission from a sensing UE may occupy resources which are reserved by a transmitting UE with sufficiently low SL-RSRP and sufficiently lower-priority traffic.

Mixed Type Scheduling-Based Inter-UE Operation

In Rel-16, resource allocation mode 2 is supported. Currently there is no mechanism for enabling very efficient inter-UE operation and coordination, especially for enabling high reliability and low latency for resource allocation mode 2 enhancement.

Figure 2:
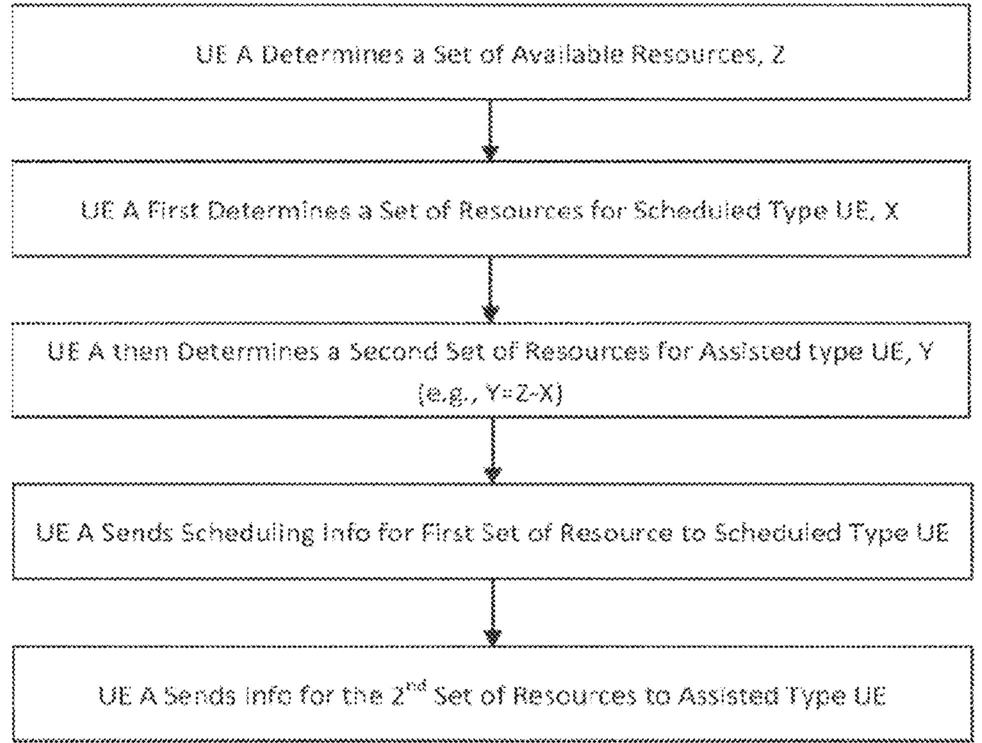
FIG. 2 illustrates resource allocation and mixed type inter-UE coordination in accordance with an aspect of the application.
Figure 3:
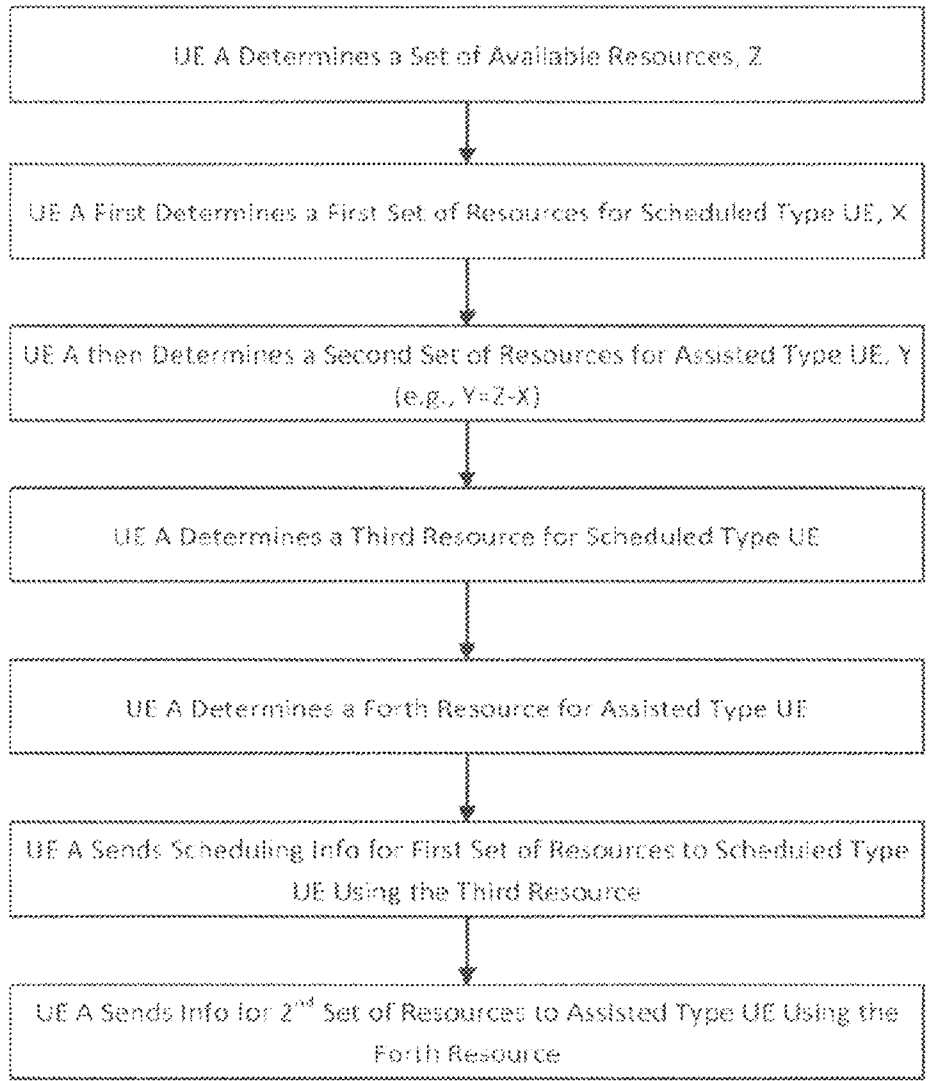
FIG. 3 illustrates an alternative resource allocation and mixed type inter-UE coordination in accordance with an aspect of the application.

When a centralized inter-UE coordination is employed, one UE may concurrently coordinate one or multiple other UEs. SL-based scheduling centralized coordination may be possible to enable high reliability and low latency sidelink communications. Resource allocation for a set of resources and mixed type inter-UE coordination is described in the embodiment shown in FIG. 2. An alternative resource allocation and mixed type inter-UE coordination is described in the embodiment illustrated in FIG. 3.

A scheduler type UE may include a UE that performs scheduling of other UEs. A scheduler type UE may also be referred to as a scheduling UE, scheduler UE, scheduling UE, and scheduling type UE in the application. On the other hand, a scheduled UE may be the UE which may be scheduled by a scheduler UE (e.g., scheduler type UE or scheduling type UE). Scheduled UE and scheduled type UE may be used interchangeably in the application.

An assistance UE (e.g., assisting type UE, assistant type UE) may be a UE providing assistance information to an assisted UE. On the other hand, an assisted UE may be a UE assisted by an assistance UE. An assistance type UE may be referred to as an "assisting UE", i.e., a helper UE that may providing some form(s) of assistance to a UE that may need assistance in the coordination operation. Assistance UE may also be referred to as an assisting UE, assistance type UE, assisting type UE, assistant UE, and assistant type UE in the application. Assisted UE and assisted type UE may be used interchangeably in the application.

Coordinator UE (e.g., coordinator type UE, coordinating UE, coordinating type UE) may be a UE which providing coordination information or signaling to other UEs. For example, coordinator UE may be a UE providing scheduling information to a scheduled UE or may provide assistance information to an assisted UE. Coordinator UE may also be a scheduler type UE and/or assisting type UE. If the coordinator UE acts in both capacities, it may be referred to as a mixed type coordinator UE. In this application, coordinator UE, coordinator type UE, coordinating UE, and coordinating type UE may be used interchangeably.

Multi-type coordination may be referring to a UE able to receive different types of coordinating signaling and information. For example, a multi-type UE may be able to receive scheduling information and assistance information from one or more coordinating UEs. A multi-type UE may be a scheduled type UE or an assisted type UE.

Scheduling type coordination may be referred to a scheduler type UE performing scheduling for a scheduled UE. Assistance type coordination may be referred to an assisting type UE providing assistance to an assisted UE.

It is envisaged according to the application that for a set of resources, subset of resources may be considered. Priority may be assigned or associated with each subset of resources. UE A may provide the set of resources, subset of resources and associated priority with each subset to UE B. UE B may consider the resource information including priority associated with resource subsets when selecting the resources and making the transmission.

Whether priority is present or absent may be configured for coordination signaling. UE B may select the resources of higher priority first for transmission. UE B may also determine to use second high priority or lower priority for transmission if needed. An indicator may be used to indicate whether "priority" should be enforced or not for UE B. If indicator is "1", then "priority" is enforced for resource selection. If indicator is "0", then "priority" is not enforced for resource selection and UE B may have flexibility to select different priority including second high priority or lower priority resources. Priority may be applied to subsets among the first set or second set of resources.

Figure 4:
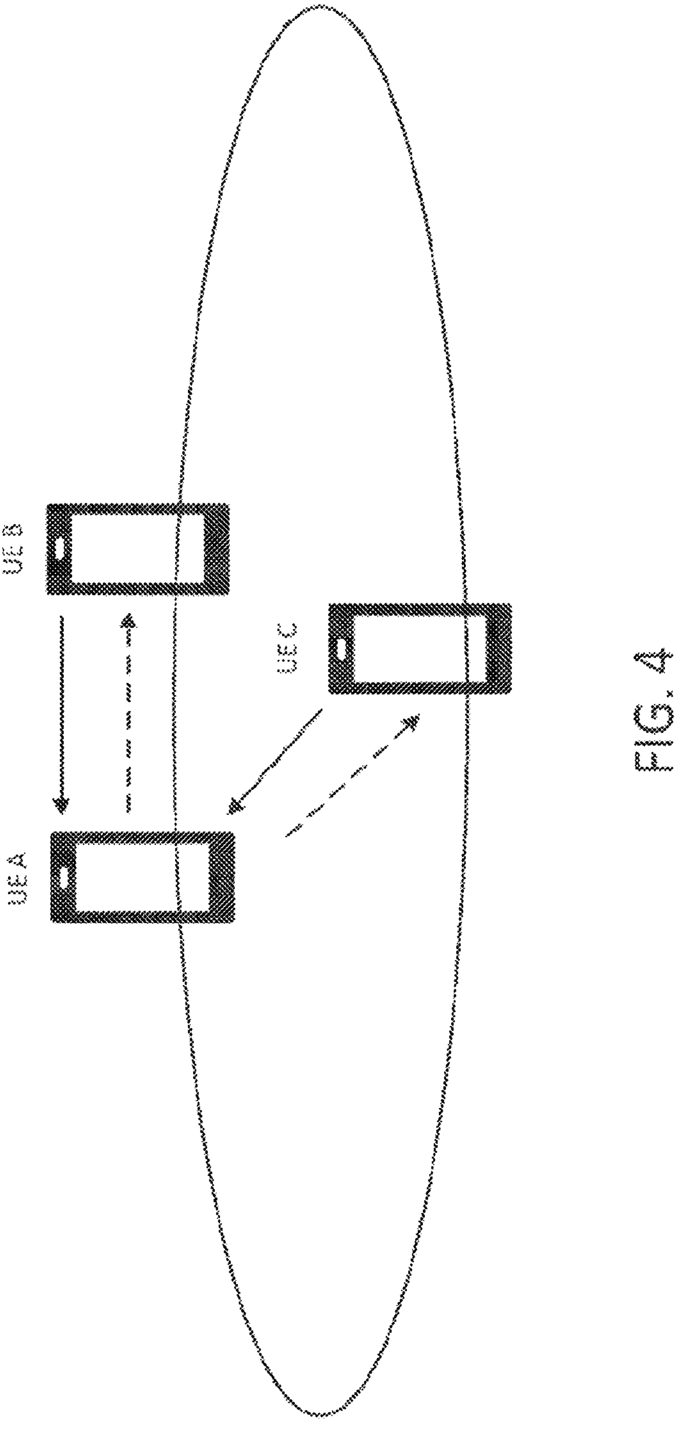
FIG. 4 illustrates a UE A as scheduling UE and UE B as transmitting UE in accordance with an aspect of the application.

Other information, such as a quality estimate of the resources from UE A perspective, e.g. channel busy ratio (CBR), or channel occupancy related information, or the like may be used and associated with resources, resource set or resource subset. The scheduler UE or assisting UE may be aware of the QoS requirement for e.g. logic channel (LCH) priority associated with the transmission. Otherwise, the resources eventually assigned by the scheduler UE might not meet the QoS requirement of the transmission According to an embodiment, UE A may be configured as the scheduler UE and UE B and UE C may be configured as the transmitting UE. This is exemplary depicted in FIG. 4. UE B may be scheduled by UE A and UE C may not be scheduled by UE A. Instead, UE C may be assisted by UE A. UE A may be configured for resources or resource pools. UE A may perform sensing on configured resources or resource pools. UE A may determine resources based on sensing and determine a set of resources available for transmission and a set of resource available for reception.

UE A may determine two sets of resources for transmitting and receiving. UE A may further determine the UE(s) which may need to be coordinated. UE A may determine coordination type. UE B may be indicated or configured as scheduled type UE. UE C may be indicated or configured as assisted type UE by gNB or coordinator type UE. In a mixed type scenario, UE A may send different types of coordination signaling to different UEs. For example, UE A may send scheduling information to UE B and assistance information to UE C.

UE A may determine two subsets of resources among the determined set of reception resources for receiving from two types of UEs, scheduler type UE B and assisted type UE C.

UE A may send scheduling information to UE B to schedule UE B's transmission and send assistance information to UE C to assist the transmission of UE C. UE A may send exact resource for UE B's transmission. This may be a subset 1. UE A may send a set of resources to UE C to be used for UE C's transmission. This may be subset 2. UE C may perform sensing based on the subset of resources indicated by UE A. In addition, UE C may also perform sensing based on the set of resources which UE C is configured but not indicated by UE A.

If the scheduled type UE has higher priority, then UE A may initially determine the scheduled resource (X) for scheduled UE B. UE A may then determine the set of resource (Y) for UE C. UE C may perform transmission based on the set of resource indicated from UE A.

The two sets of resources may be common or dedicated. The two sets of resources may be shared either with full overlap or partial overlap. In one embodiment, it may use dedicated resources for scheduling the UE B and another dedicated set of resources for assisting the UE C.

In another embodiment, a shared set of resources may be used for both a scheduled type UE and assisted type UE. That is, UE B and UE C may share the same set of resources. For example, if the two sets available resources are Z, and they are shared with full overlap. If the scheduled resource for scheduled type UE is X, then the set of resource for assisted type UE may be Y, and Y=Z−X.

Figure 5:
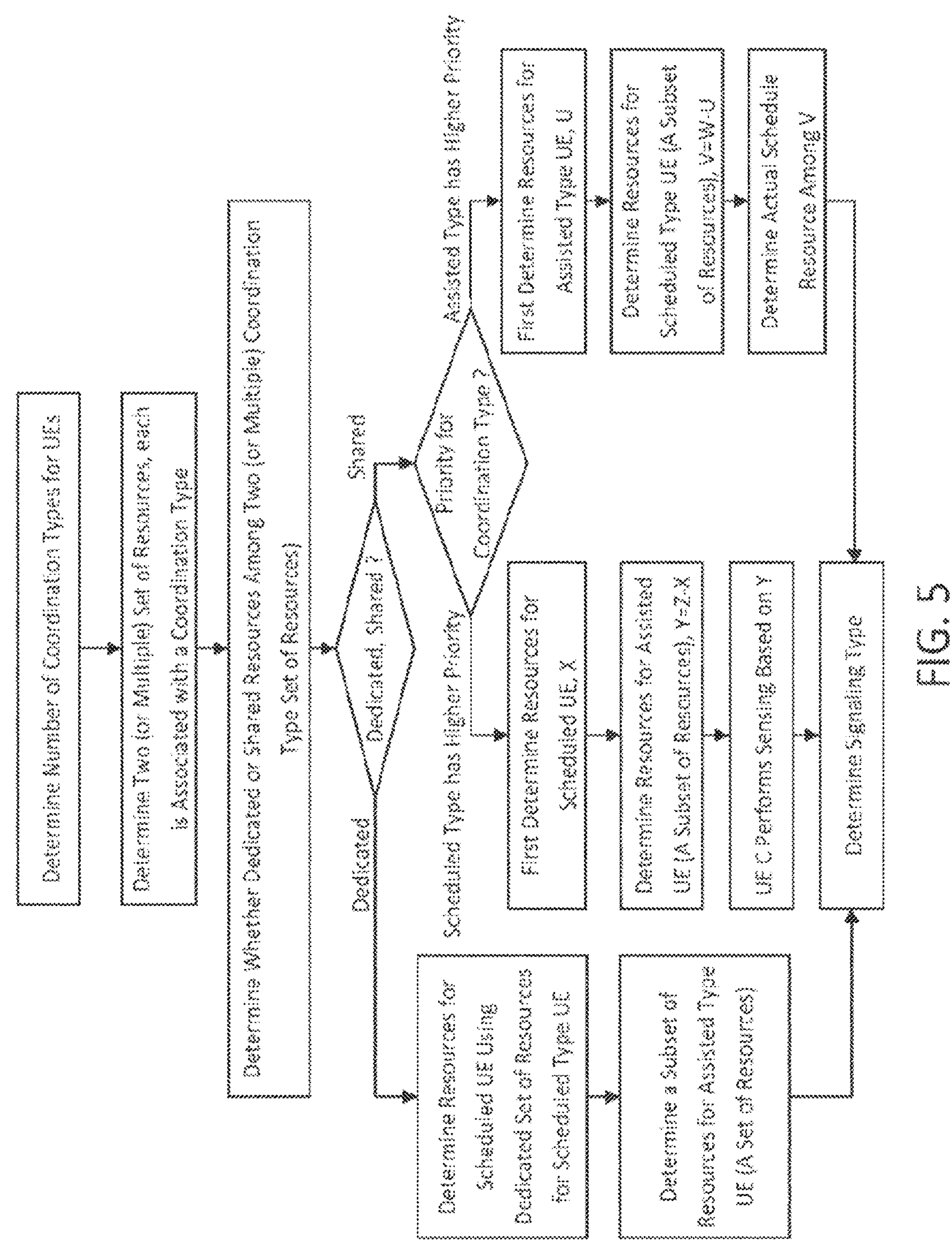
FIG. 5 illustrates a mixed type resource allocation for inter-UE coordination in accordance with an aspect of the application.

In another embodiment, mixed type resource allocation for inter-UE coordination is exemplarily depicted in FIG. 5. As shown in FIG. 5, UE A may determine the number of coordination types for UEs that UE A may need to provide coordination. UE A may determine two (or multiple) sets of resources. Each set of resources may be associated with or indicated with a coordination type. Each coordination type may be indicated with or associated with a priority. UE A may determine whether the sets of resources are dedicated or shared resources among two (or multiple) coordination types.

If the sets of resources are dedicated resources, then UE A may further determine the priority of coordination type. If scheduled type has higher priority, then UE A may first determine the resources for scheduled UEs (e.g., UE B), e.g., resources X. UE A may determine the exact resources for scheduling. Alternatively, UE A may first determine a set of resources and then determine the exact resources X among the set of resources that is determined for scheduling. In addition, UE A may determine the resources Y for assisted UE (a subset of resources), e.g., Y. Y may be determined by X and Z, e.g., Y=Z−X.

UE A may indicate X to UE B. UE B may follow the X information without sensing. UE A may indicate Y to UE C. UE C may perform sensing based on Y. UE A may determine the signaling type based on coordination type.

If assistance type has a higher priority, then UE A may first determine the resources U for assisted type UE. UE A may determine the resources V for scheduled UE (or a subset of resources), V. V may be determined by W and U, e.g., V=W−U and W is the total available resources determined by UE A. UE A may further determine the actual scheduling resources D among V.

For example, for random resource selection in a resource pool that is configured or preconfigured with different sensing and resource allocation schemes such as partial sensing, full sensing and random resource selection, a priority threshold value or a range of priority levels may be (pre-) configured for the resource pool, resource set or resource subset. Only the priority is higher than priority threshold, random resource selection may be allowed for this resource pool. That is, when priority value of resources is below or within the range, random resource selection may be allowed to use the resources in case that lower value means higher priority. Resource pool partitioning such as resource set or resource subset or the like may be used. Different priority may be associated with resource pool partitions, resource sets or resource subsets or the like. The priority may be increased for the transmission based on random selection and the new priority value may be indicated in the priority field in the sidelink control information e.g., in the $1^{st}$-stage SCI. Another control field may be added in SCI to indicate the priority value associated with QoS. Also 1-bit control field may be carried in the sidelink control information SCI, e.g., in the $1^{st}$-stage SCI for indicating that the UE may be performing random resource selection. Additional control field may also be added in sidelink control information SCI, e.g., in the $1^{st}$-stage SCI to indicate the mapping to the priority value that is associated with QoS. The resources reserved by UE performing random selection may be excluded regardless of their priorities. 1-bit control field in the SCI may indicate that the UE may be performing random resource selection and not performing re-evaluation and pre-emption checking. UE performing random selection may be with or without re-evaluation and/or pre-emption checking.

If the sets of resources are dedicated resources, then UE A may determine resources for scheduled UE using dedicated set of resources for scheduled type UE. UE A may determine a subset of resources for assisted UE (or a set of resources). UE A may determine signaling type based on coordination type.

According to a further embodiment, methods are envisaged to add transmission capability to the SL SCI mechanism. As generally understood in available NR sidelink techniques, resource allocation may be included in the first stage SCI for scheduling of UE's reception, and not included for scheduling UE transmission. To support UE transmission, it is envisaged to include protocols to help distinguish between transmission and reception of the scheduled UE.

In accordance with another embodiment, the present application describes resource allocation techniques to support UE transmission in addition to reception based on scheduling information, e.g., UE B transmission. To support flexible scheduling for both transmission and reception, techniques are described herein where resource allocation may be distinguished between transmission and reception. In an exemplary embodiment, a TX/RX indicator may be included in the SCI, e.g., in the first stage SCI. The corresponding resource allocation may be interpreted based on this indicator to determine the status of transmission and reception.

A TX/RX indicator may be introduced in SCI format. If the TX/RX indicator indicates "1" or "TX", time resource and frequency resources may be indicated in the SCI field time resource assignment and frequency resource assignment used for transmission of PSSCH. On the other hand, when the indicator indicates "0" or "RX", time resource and frequency resources may be indicated in the SCI field time resource assignment and frequency resource assignment used for reception for PSSCH. Table 2 below provides an example. A legacy SCI format e.g., SCI format 1-A may be reused. Legacy UE may read legacy information. Rel-17 UE with the scheduling-based capability or support scheduling-based coordination, e.g., a scheduled type UE should read the TX/RX indication field and interpret the time/freq resources differently, properly and accordingly. Alternatively, a new SCI format, e.g., SCI format 1-x or SCI format 1-B may be introduced.

The SCI format may be configured by gNB e.g., via RRC or PC5-RRC. The size of SCI format as well as the size of control field in SCI format and the presence/absence of control field may be configurable by gNB e.g., via RRC or PC5-RRC signaling.

UE may report its capability to gNB and/or coordinator UE. The capability report may indicate whether new SCI format may be required or not if UE capability supports inter-UE coordination using new SCI format.

TABLE 2

| SCI field x - TX/RX Bit IND | SCI field x - TX/RX IND | frequency resource assignment | time resource assignment |
|---|---|---|---|
| "1" | TX | Indicated frequency resource is used for TX | Indicated time resource is used for TX |
| "0" | RX | Indicated frequency resource is used for RX | Indicated time resource is used for RX |

There may be one first stage SCI for the transmitter and another first stage SCI for the receiver. These may be different. Alternatively, a link index in the SCI may indicate transmitter(s) and receiver(s). The link index table may be indicated, configured, or preconfigured.

The control fields time resource assignment and frequency resource assignment may indicate up to N time/freq resources, e.g., N may be two or three. N may also be more than three. Depending on whether transmitting and/or receiving scheduling is enabled or not, N may be configured to support it. In addition, depending on the number of transmitting and/or receiving UEs that is enabled, N may be configured to support the maximum number of transmitting and/or receiving UEs.

Figure 6:
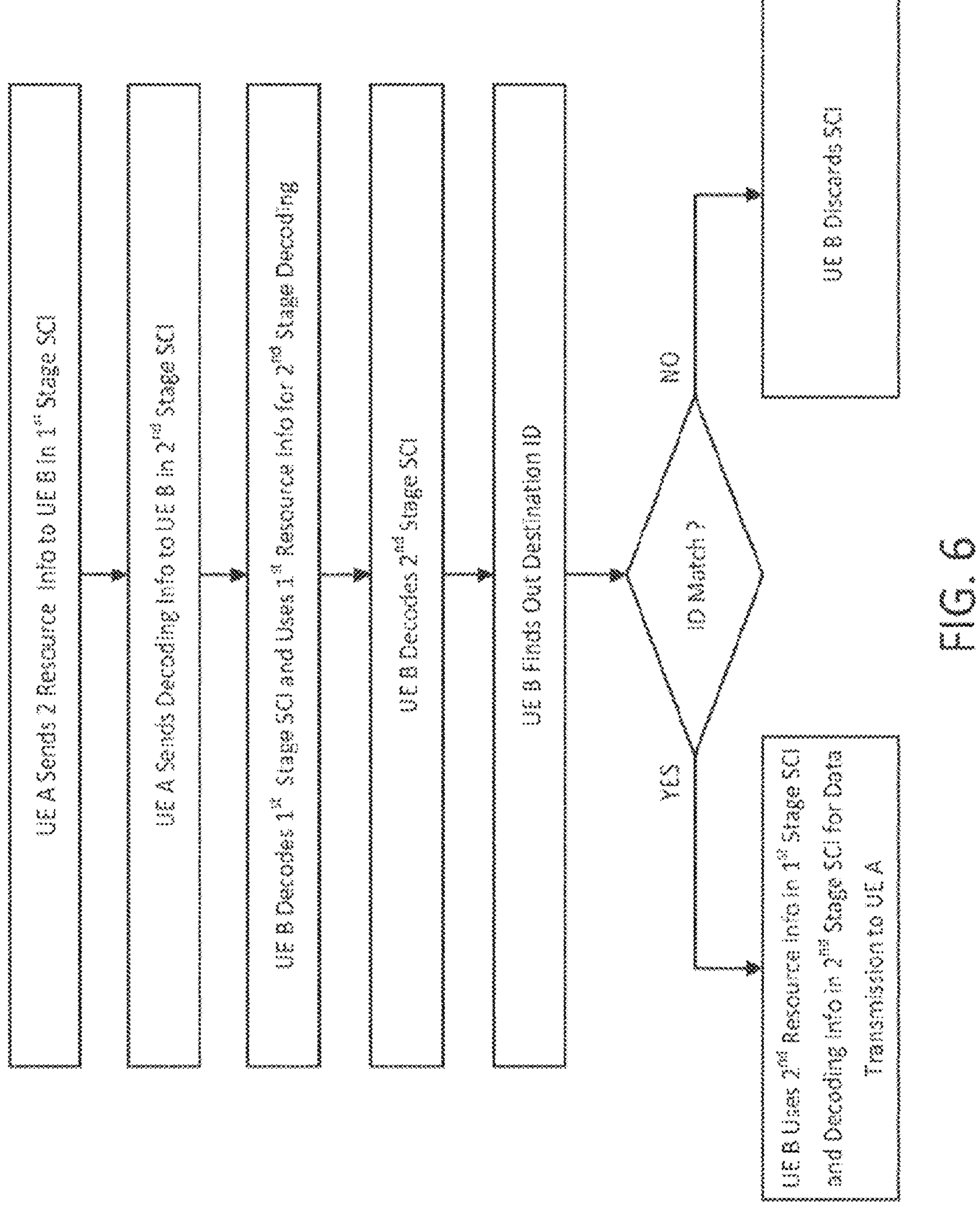
FIG. 6 illustrates a method of PSCCH/PSSCH (both resource allocation and decoding information is given by UE A as part of scheduling information in accordance with an aspect of the application.

Legacy SL UE may ignore TX/RX indicator and decode SCI. Rel-17 SL UE may read TX/RX indicator to interpret the resource field correctly. When the flag indicates "TX", time resource and frequency resources that are indicated in SCI fields time resource assignment and frequency resource assignment should be used for transmission for PSSCH. According to one solution as shown in FIG. 6 for example, both the first stage and second stage SCI for UE A's reception may be sent to UE B as part of the scheduling information. In this case, UE B may decode both SCI and interpret them as reception parameters for UE A. UE B may use them for transmission with proper update if needed. UE B may transmit only PSSCH according to these parameters including all information regarding decoding PSSCH at UE A, e.g., parameters for HARQ, MCS, NDI, etc. The resource allocation and decoding information may be given by UE A as part of scheduling information.

Figure 7:
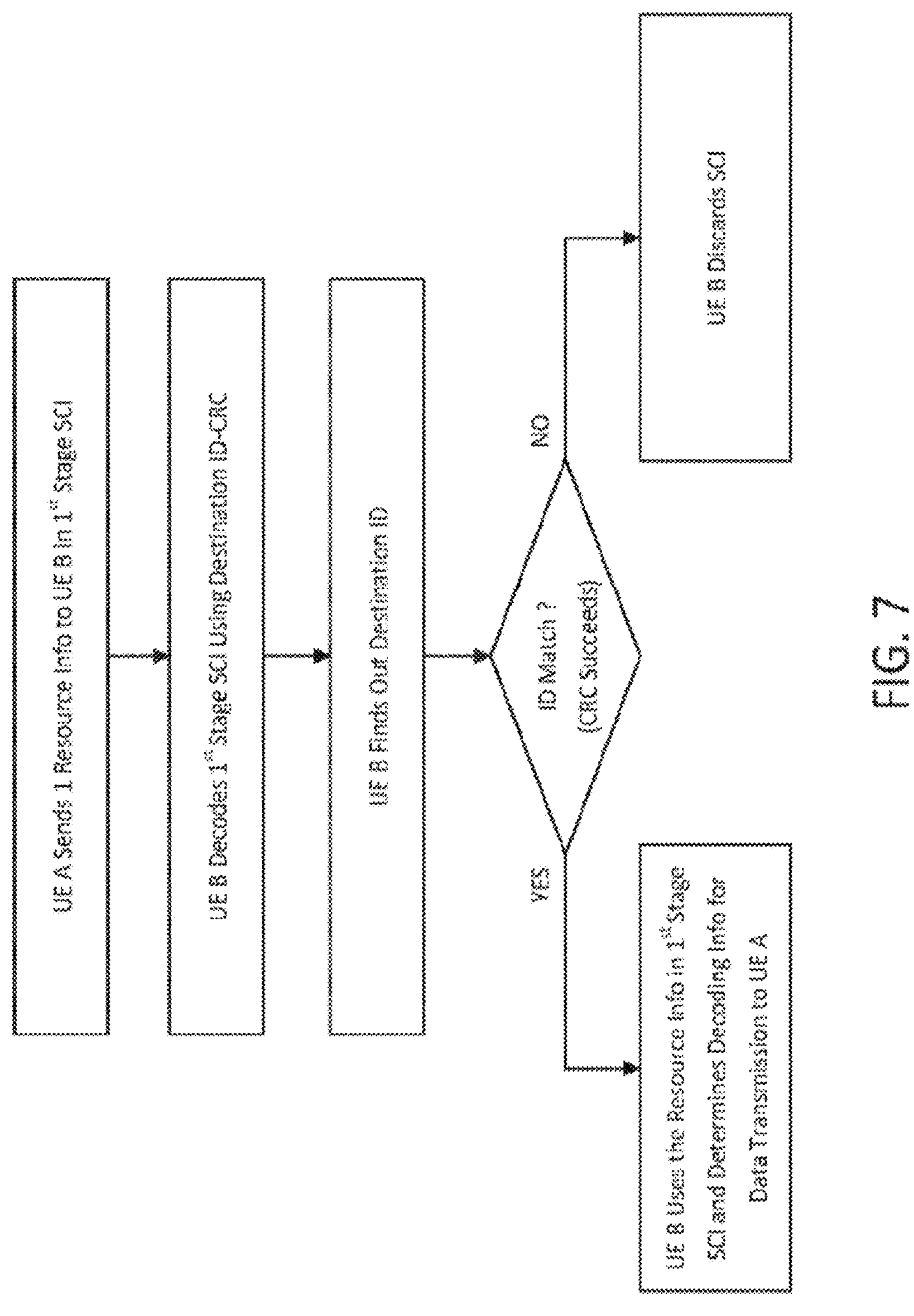
FIG. 7 illustrates a method of PSCCH/PSSCH (only resource allocation is given by UE A as part of scheduling information. Decoding information is determined by UE B) in accordance with an aspect of the application.

In another solution of this aspect, as depicted in the embodiment of FIG. 7, it may be that only the first stage SCI for UE A's reception may be sent to UE B. In this case, UE B may decode only single SCI stage or the first stage SCI and use them as reception parameters for UE A. UE B may use them for transmission with a proper update if needed. Then UE B may transmit both second stage SCI and PSSCH accordingly including parameters, such as HARQ, MCS, NDI, etc. UE A may need to decode the second stage SCI and PSSCH, but does not need to decode the first stage SCI since UE A already knows the first stage SCI. Only resource allocation may be given by UE A as part of scheduling information. Decoding information may be (autonomously) determined by UE B. In another embodiment, a scheduler UE may delegate the scheduling function to another UE, e.g., a UE B and then assign yet another UE e.g., UE C as an assistant UE.

Unified Inter-UE Coordination and Type Adaptation

In yet even another embodiment, multiple type coordination schemes may coexist in a system. Protocols are described herein which define, configure, indicate or request different type(s) of coordination messages and/or different type(s) of assistance information and allow, enable, and/or disable different coordination type for system optimization and enhancement for reliability, latency and power. A multi-type coordination may be referred to a UE which may be able to receive different types of coordinating signaling and information. For example, a multi-type UE may be able to receive scheduling information and assistance information from one or more coordinating UEs.

Multiple type coordination may be supported for a UE, e.g., a coordinated UE. UE may adapt between multiple types to achieve higher reliability and lower latency. Performance of inter-UE coordination may depend on highly reliable and low latency coordination signaling. Enhancement to resource allocation for reliability and latency may rely on fast and reliable coordination signaling.

To enable higher reliability signaling, the UE may select scheduled type (scheduling type). Scheduling information may have smaller payload size and may be carried in control channel which has higher reliability. In addition, scheduled type may avoid or mitigate collision which may provide further enhancement to reliability. A scheduling type may be referred to scheduling grant, or the like.

Assistance type may be referred to information related to collision, sensing results, half duplex, hidden node, etc., or the like. Assistance information may also include QoS related information of the transmission being coordinated, assisted or scheduled. Such QoS information may be modeled for e.g. by one unique metric such as LCH priority or the like.

To enable low latency, UE may select assisted type (or assistance type). Since transmitting UE may not need to decode scheduling grant, UE may not need to wait for scheduling grant, thus lower latency may be achieved. In addition, UE may autonomously select the resource for transmission without decoding frequent scheduling grant, thus decoding latency and complexity may be avoided. Lower latency and complexity may be achieved.

To enable power saving, UE may select scheduler type (or scheduling type). Transmitting UE may not need to perform sensing, power consumption due to periodic sensing may be avoided. Therefore, power saving may be achieved.

To enable higher performance, UE may select assisted type (or assistance type). Assistance type typically has larger payload and may be carried in PSSCH. However, UE may not need to send assistance information as frequent as dynamic scheduling type information. Lower overall signaling overhead may be achieved.

A small payload assistance information may be used. This may achieve higher reliability and/or lower latency. However, due to smaller payload size, it may affect what type of assistance that UE should use since not all types of assistance information may be signaled due to small payload size. Selection of type of assistance information may depend on conditions such as collision status, half duplex status, hidden node status, exposed node status, or the like.

UE may perform adaptation between coordination types based on the condition(s), requirement(s), and/or service type(s), or the like to enable enhancement to reliability, latency, power, signaling overhead, complexity, etc.

Different type(s) of coordination signaling may be defined and developed. For example, scheduling type coordination signaling or assistance type coordination signaling may be defined and developed. UE B may request different type(s) of coordination signaling for scheduling-based or assistance-based inter-UE coordination and operation. For example, UE B may request scheduling type, assistance type or both.

Different type(s) of assistance information may be defined and developed. UE B may also request different type(s) of assistance information if coordination signaling also include assistance information. For example, different assistance information types may be related to hidden node, exposed node, collision, half duplex, etc. to assist TX UE for transmission. UE may request different types of assistance information, e.g., collision type, half duplex type, exposed node type, hidden node type, any combination of them, etc. or the like The more assistance information there is, the better the inter-UE operation performance may be enhanced. This may enhance mode 2 performance. However, signaling overhead and complexity may increase. Efficient delivery of coordination signaling may be needed. If all assistance information is carried in SL data channel, then failure of SL data channel decoding may result in total loss of coordination message and/or assistance information.

Figure 8:
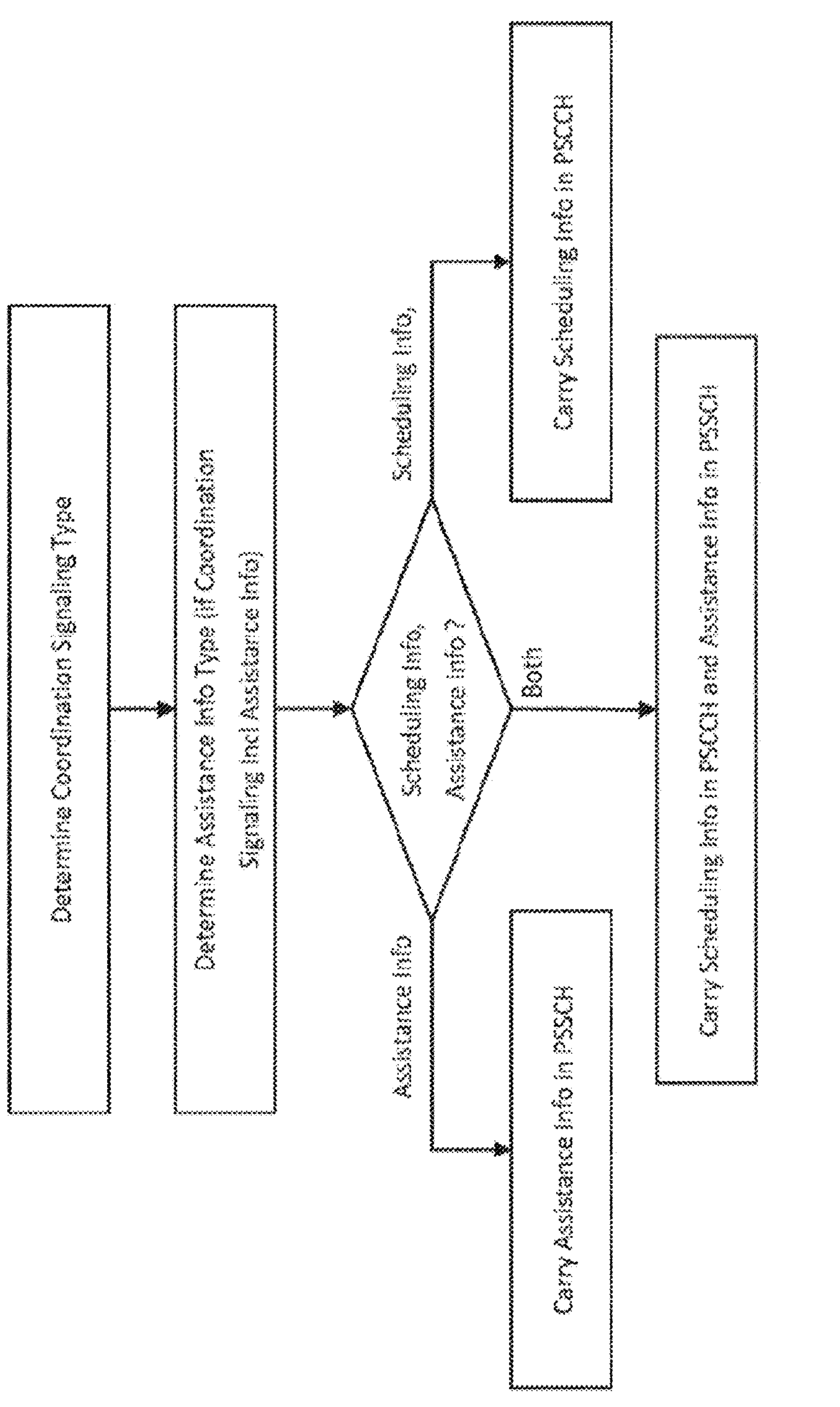
FIG. 8 illustrates a coordination signaling type dependent delivery scheme in accordance with an aspect of the application.

According to one embodiment, types of coordination message may be configured and/or indicated. Coordination signaling type dependent delivery scheme is depicted in an exemplary embodiment as shown in FIG. 8.

In another embodiment, both scheduling information and assistance information may also be carried in PSSCH or SL-SCH. Coordination signaling may contain either scheduling information, assistance information, or both. An example containing both scheduling type and assistance type information is provided in Table 3 below. Coordination signaling may be carried via SCI, PSCCH, PSSCH, SL data channel, SL-SCH, MAC CE and/or RRC. Coordination signaling may be carried via a new type SCI or new type physical signal and/or channel.

TABLE 3

| Coordination message | |
|---|---|
| Scheduling type information | Assistance type information |

An example containing either scheduling type, assistance type information or both with bit indication is provided in Table 4 below.

TABLE 4

| Bits | Type |
|---|---|
| "00" | Assistance type information |
| "01" | Scheduling type information |
| "10" | Scheduling + assistance types |
| "11" | Reserved |

UE B may send request signal as shown in Table 4 to indicate the type of coordination signaling it may request from UE A. Alternatively, UE A may (autonomously) determine the type of coordination signaling and indicates the selected signaling type to UE B according to Table 4.

According to a further embodiment, payload size adaptive channel selection may enhance reliability, reduce latency and reduce power. It is envisaged in accordance with this application in an embodiment for payload size adaptive channel selection to enhance reliability, reduce latency and reduce power for inter-UE coordination. This may be based on resource allocation mode 2 operation.

Coordination signaling may contain assistance information and/or scheduling information, etc. Depending on the payload size of coordination signaling, different signals and/or channels may be used. For example, if payload size of coordination signaling is less than a threshold, SCI may be selected to carry coordination signaling. Otherwise coordination signaling may be carried in SL data channel in PSSCH. The threshold may be predefined, pre-configured or indicated, or the like.

SCI may be preferred in some instances given its control channel having higher reliability and lower BLER than a data channel. In addition, the physical channel may be preferred in some instances because it is fast and the latency and delay for PHY signaling is smaller than higher layer signaling. Therefore, both reliability and latency may be enhanced.

Coordination signaling may be carried in SL control channel e.g., SCI. However, this may be limited to a certain payload size for coordination signaling. Coordination signaling may be carried in SL data channel in PSSCH. Multiplexing of control information onto PSSCH or data channel may be performed. Coordination signaling may be carried in SL control or data channel depending on the payload size of coordination signaling. It may be adaptive based on the request. Depending on the type(s) of coordination signaling that are requested, different types of assistance information may be sent. Request signal may request different types of coordination signaling, e.g., scheduling type and/or assistance information type and thus coordination signaling payload size may vary.

Figure 9:
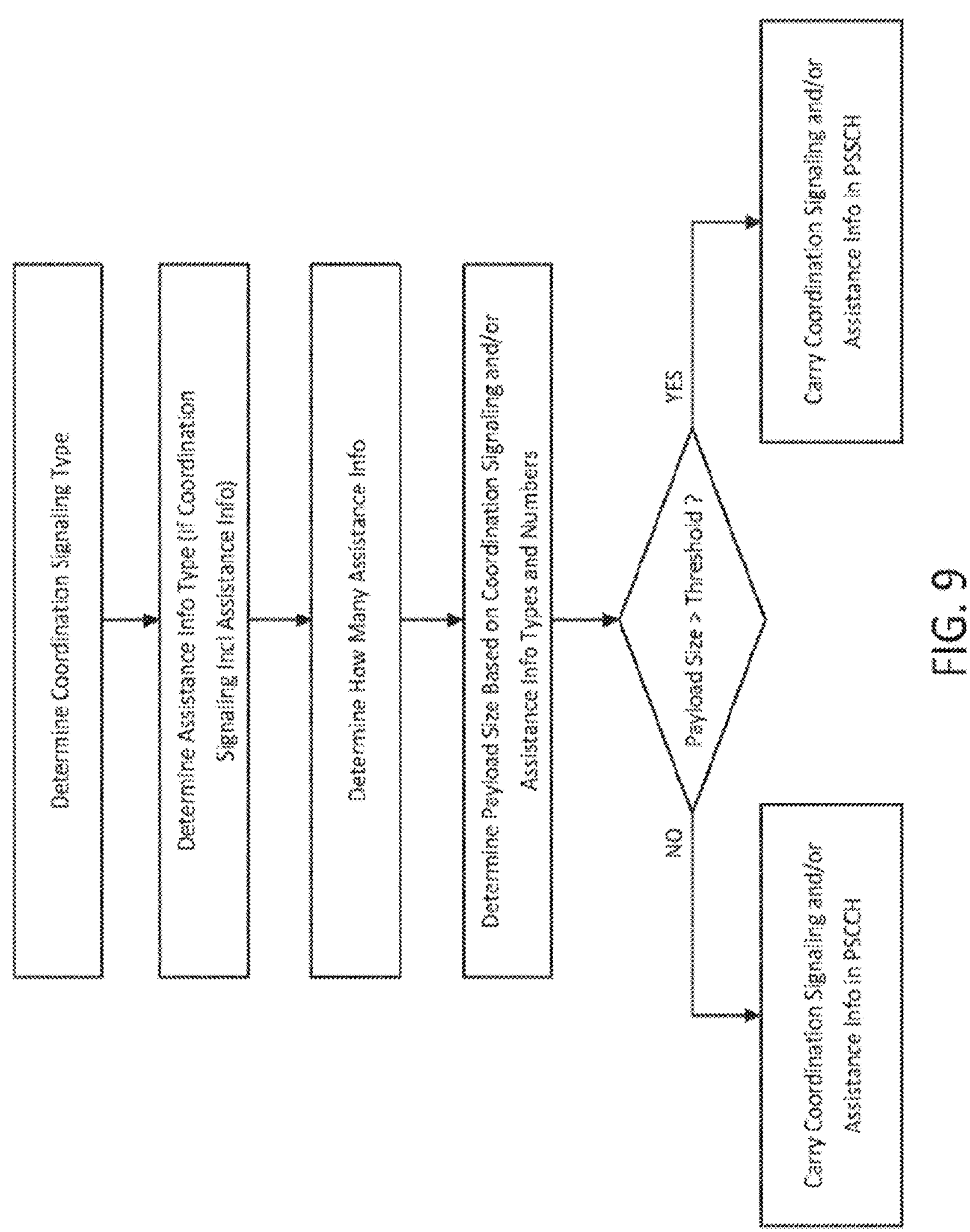
FIG. 9 illustrates a scheme of payload size dependent coordination signaling and/or assistance information delivery in accordance with an aspect of the application.

According to even a further embodiment, a scheme of payload size dependent coordination signaling and/or assistance information delivery may be exemplarily depicted in FIG. 9. This may include a RX UE or TX UE to perform the determination. It may also be based on predefined or (pre-) configured mapping, criteria and/or rules, etc.

For SL control channel, coordination signaling may be carried in the first stage SCI and/or the second stage SCI. For the second stage SCI, the coded coordination signaling bits in the second stage SCI may be multiplexed onto PSSCH according to the procedures. Multiplexing of coded coordination signaling or the second stage SCI bits to PSSCH may be based on the determined size of coordination signaling, payload size, number of layers for transmission, modulation order, etc.

Based on the payload size of coordination signaling, the first stage SCI, the second stage SCI, SCI, PSCCH, PSSCH, MAC CE, RRC, SL-SCH, or data channel may be selected to carry coordination signaling. PSCCH and/or PSSCH may be selected to carry coordination signaling based on the payload size of coordination signaling. By doing so, the reliability and latency could be enhanced, and performance could be optimized.

In another embodiment, the UE may perform (autonomous) channel selection or NW may control channel selection for adaptive channel selection. When UE (autonomous) channel selection is used, if the first stage SCI is selected, then an indication may be carried in the first stage SCI indicating that it is the first stage SCI only and no more information follows. If the second stage SCI is selected, then an indication may be carried in the first stage SCI indicating that it may be the second stage SCI and please continue to decode the second stage SCI. If data channel is selected, then an indication may be carried in the first stage SCI (or the second stage SCI) indicating that it may be data channel and please continue to decode the data channel.

Priority-Based Coordination Signaling Operation And Mechanism

According to yet a further embodiment, the application describes priority-based coordination signaling adaptation mechanisms. If an aperiodic method is used, payload size of coordination signaling and/or message may vary. If a periodic method is used, payload size of coordination signaling and/or message may be fixed or the same. Different types of coordination signaling and/or message have different priority and/or periodicities or the like. Different types of assistance information may also have different priorities and/or periodicities, etc. Higher priority assistance information may be sent more frequently (with periodicity x, e.g., shorter) and lower priority assistance information may be sent less frequently (with periodicity y, e.g., longer).

For the periodic method, when different types of coordination signaling and/or different types of assistance signaling collide, they may be combined or aggregated, thus the payload size of coordination signaling and/or message may vary. The first stage SCI, the second stage SCI, SCI, PSCCH, PSSCH, MAC CE, RRC, SL-SCH or data channel may be selected to carry the aggregated information or coordination signaling. A predefined, (pre-) configured, or indicated payload size may be used. Different types of coordination signaling and/or different types of assistance signaling may be combined or aggregated according to the priority. Higher priority types of coordination signaling and/or different types of assistance signaling may be initially combined or aggregated. Lower priority types of coordination signaling and/or different types of assistance signaling may be dropped.

Higher priority coordination message or assistance information may be carried in SL control channel e.g., SCI. For example, lower priority coordination signal/message or assistance information may be carried in SL data channel in PSSCH. If SL data channel is not decoded successfully, SCI may still be decoded successfully. This may enhance the reliability of transmission and reception since mode 2 reliability depends on reliability of inter-UE operation which relies on reliable coordination message and/or assistance information.

Figure 10:
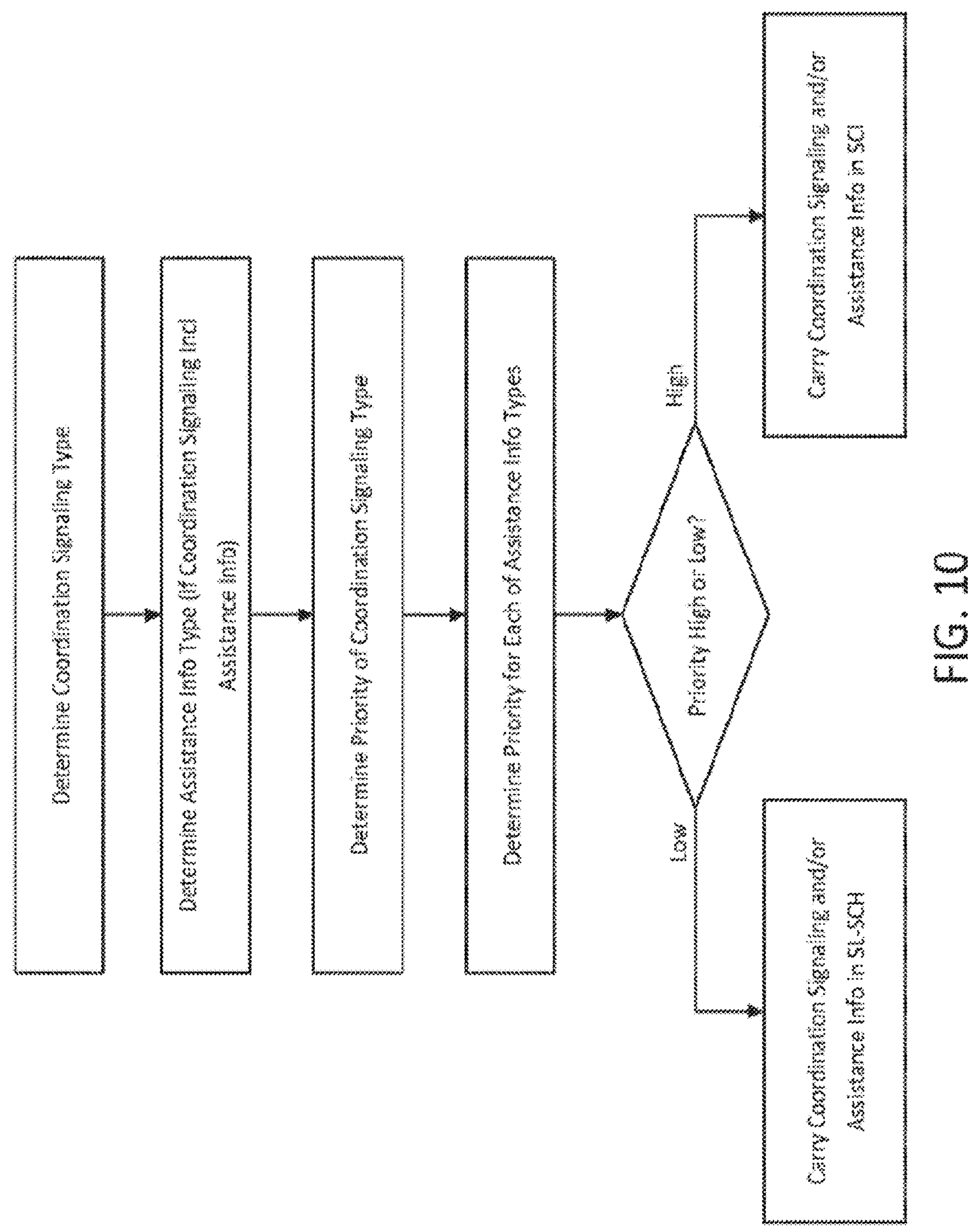
FIG. 10 illustrates a scheme of priority-based delivery for coordination signaling and/or assistance information in accordance with an aspect of the application.

In a further aspect, a scheme of priority-based delivery for coordination signaling and/or assistance information may be depicted in the exemplary embodiment in FIG. 10. The payload size may also map to or associated with priority via predefined, (pre-)configured or indicated mapping(s), criteria and/or rule(s) or the like.

Condition-driven coordination signaling adaptation may also be used. If condition is met, then either scheduling information or assistance information may be selected as coordination signaling or message depending on the criteria and/or rule(s) or the like. Conditions may be related to status of collision, hidden node, or the like. A predefined and/or pre-configured and/or indicated association(s), mapping(s), criteria and/or rule(s) may be used.

Figure 11:
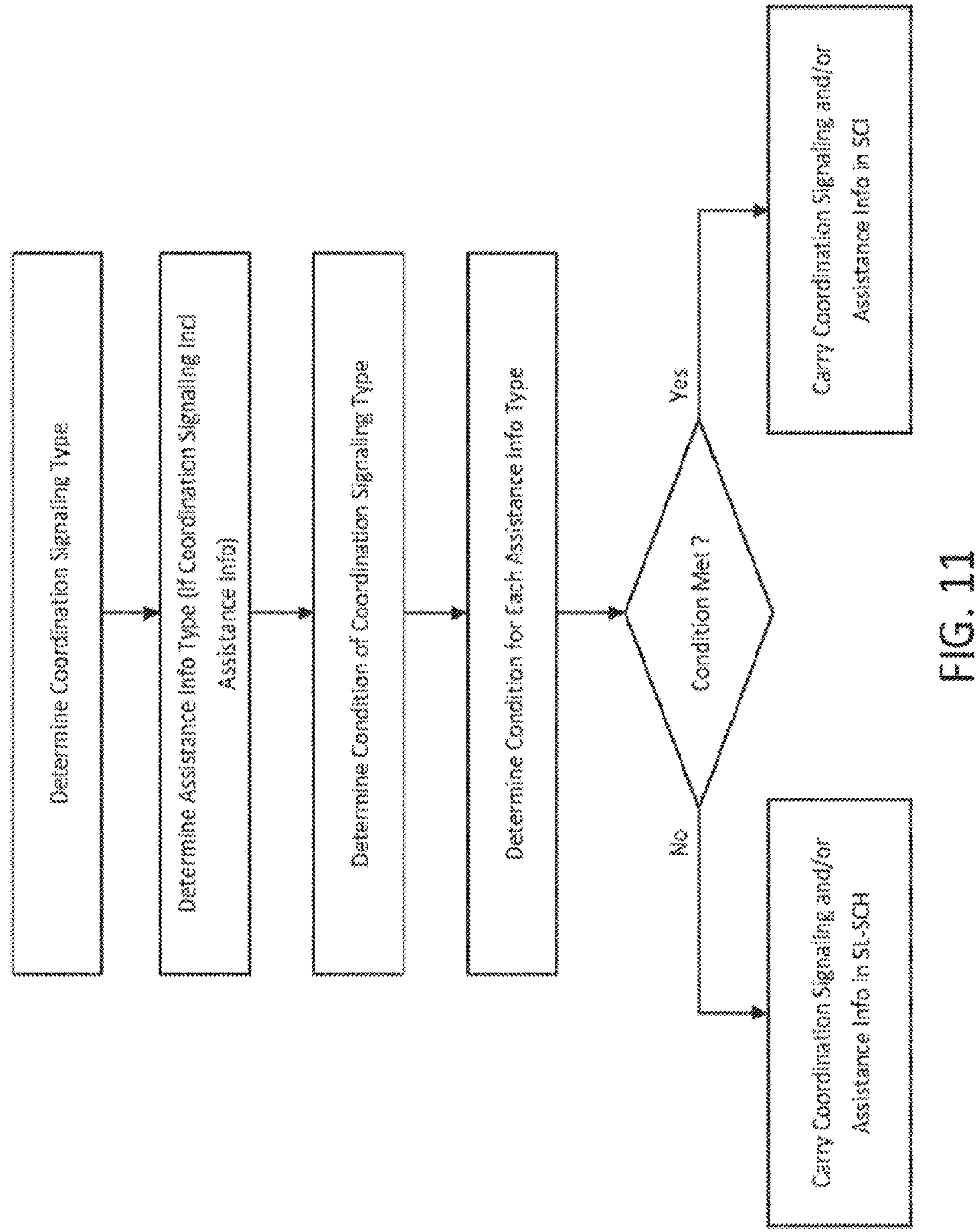
FIG. 11 illustrates a scheme of condition-based delivery for coordination signaling and/or assistance information in accordance with an aspect of the application.

In even a further aspect, a scheme of condition-based delivery for coordination signaling and/or assistance information may be depicted in the exemplary embodiment in FIG. 11. The first stage SCI, the second stage SCI, SCI, PSCCH, PSSCH, MAC CE, RRC, SL-SCH or data channel may be selected to carry the information.

In one embodiment, adaptation procedures for which type of coordination signaling or message may be used. It may be NW control. It may also be UE suggested or triggered. Alternatively, it may be UE autonomous selection.

Joint priority based and payload size dependent adaptation for coordination signaling may be used. In order to receive assistance information, priority for assistance may be set to high or highest. Such priority may be set regardless QoS, etc. Such priority may be set based on physical layer and may or may not be related to higher layer or PPPP.

Figure 12:
FIG. 12 illustrates a scheme of joint priority-based and payload size dependent delivery for coordination signaling and/or assistance information in accordance with an aspect of the application.

In yet another embodiment, a scheme of joint priority-based and payload size dependent delivery for coordination signaling and/or assistance information may be depicted in FIG. 12. It is envisaged to enable enhancement of sensing and resource (re-)selection procedure with coordination signaling. Coordination signaling may be used to assist UE B's transmission including sensing and/or resource (re-)selection. UE A may send assistance information to UE B. Assistance information may be used during the sensing procedure.

Alternatively, UE A may send scheduling information to UE B. Scheduling information may or may not be used in the sensing procedure. If sensing is not required, UE B may just follow the scheduling information that UE A sends. Since it is centralized by scheduling, sensing may not be needed among UE Bs which are scheduled by UE A.

UE B may perform sensing in an embodiment. UE B may determine the candidate resources based on sensing results. UE B may select resource(s) from candidate resources for transmission. UE B may reserve up to N resources for transmission. UE B may check if there is any aperiodic traffic certain time before transmission. If no aperiodic traffic with high priority occupies the resource, then UE B may use the first reserved resource for transmission.

If there is aperiodic traffic with a high priority occupying the resource, UE B may reevaluate resource and reselect resources. UE B may again reserve up to N resources. Before the transmission, UE B may check if there is any aperiodic traffic certain time before that transmission again. If it is ok to transmit, then UE B may transmit accordingly. Before the next transmission in next reserved resource, UE B may check if resource need to be reselected or not. If not, UE B may continue to transmit. If yes, UE B may reselect the resource and reserve up to N resources again. Such procedure may repeat.

Assistance information from UE A may be used during resource selection and reselection procedures. UE A may provide resource availability including periodic resource and/or aperiodic resource to UE B to assist its sensing. Alternatively, UE A may provide resource availability including periodic resource and/or aperiodic resource to UE B to assist its resource selection. In addition, UE A may provide resource availability including periodic resource and/or aperiodic resource to UE B to assist its resource reselection.

UE A may provide same or different types of assistance information such as collision, sensing results, half duplex status, hidden node status, exposed node status, etc. Different types of assistance information may be sent or requested in periodic, semi-periodic, or aperiodic manner and/or in different offset(s) and/or periodicities.

Depending on the timeline and usage, UE B may request such assistance information from UE A. Alternatively, UE A may send periodic assistance information to UE B. UE A may send periodic assistance information or aperiodic information to UE B based on indicated, predefined and/or pre-configured condition(s), criteria and/or rule(s). A semi-periodic assistance information may also be possible to be sent to UE B. For example, UE B may request assistance information for a time window, size and/or offset of window may be indicated, pre-configured or predefined. In addition, UE A may trigger assistance information for a time duration which may be indicated, pre-configured or predefined. The request or trigger may also include an offset and/or periodicity to enable different types of assistance information to be sent more efficiently and flexibly.

UE B may request assistance information before the procedure, e.g., for sensing procedure, for candidate resource selection, for resource selection procedure, for resource reevaluate procedure, or for resource reselection procedure including resource reservation procedure, or combination of them. UE B may use assistance information in any procedure, any combination of them, or all of the procedures.

Figure 13:
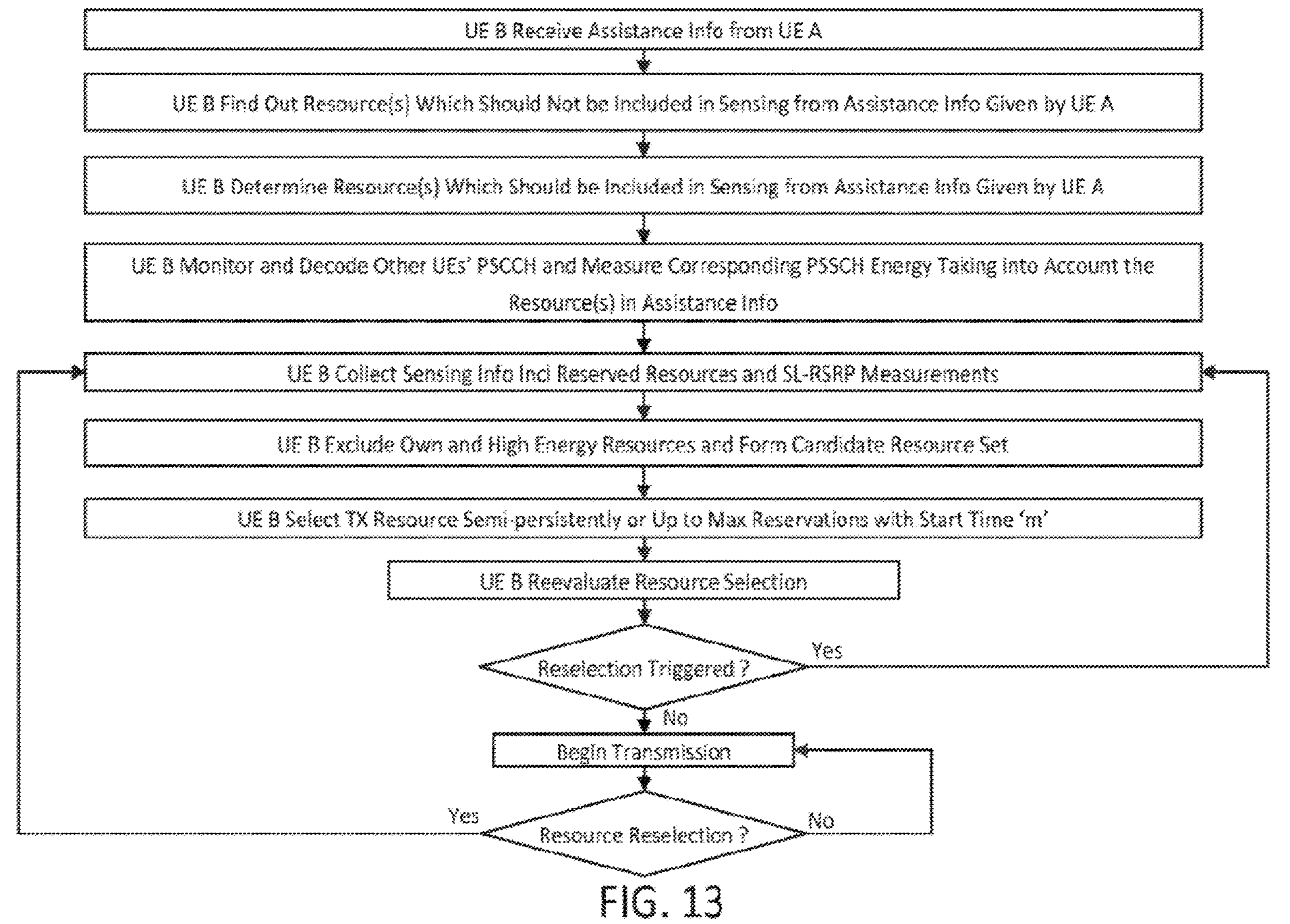
FIG. 13 illustrates assistance information for assisting sensing procedure in accordance with an aspect of the application.

In another aspect, assistance information for assisting sensing protocols is described in the exemplary embodiment depicted in FIG. 13. In case of periodic assistance information, the UE may use assistance information certain time before sensing window, another certain time before resource selection window, and so on. If UE passes the time threshold(s) for periodic assistance information, the UE may discard the information during the procedure(s).

Figure 14:
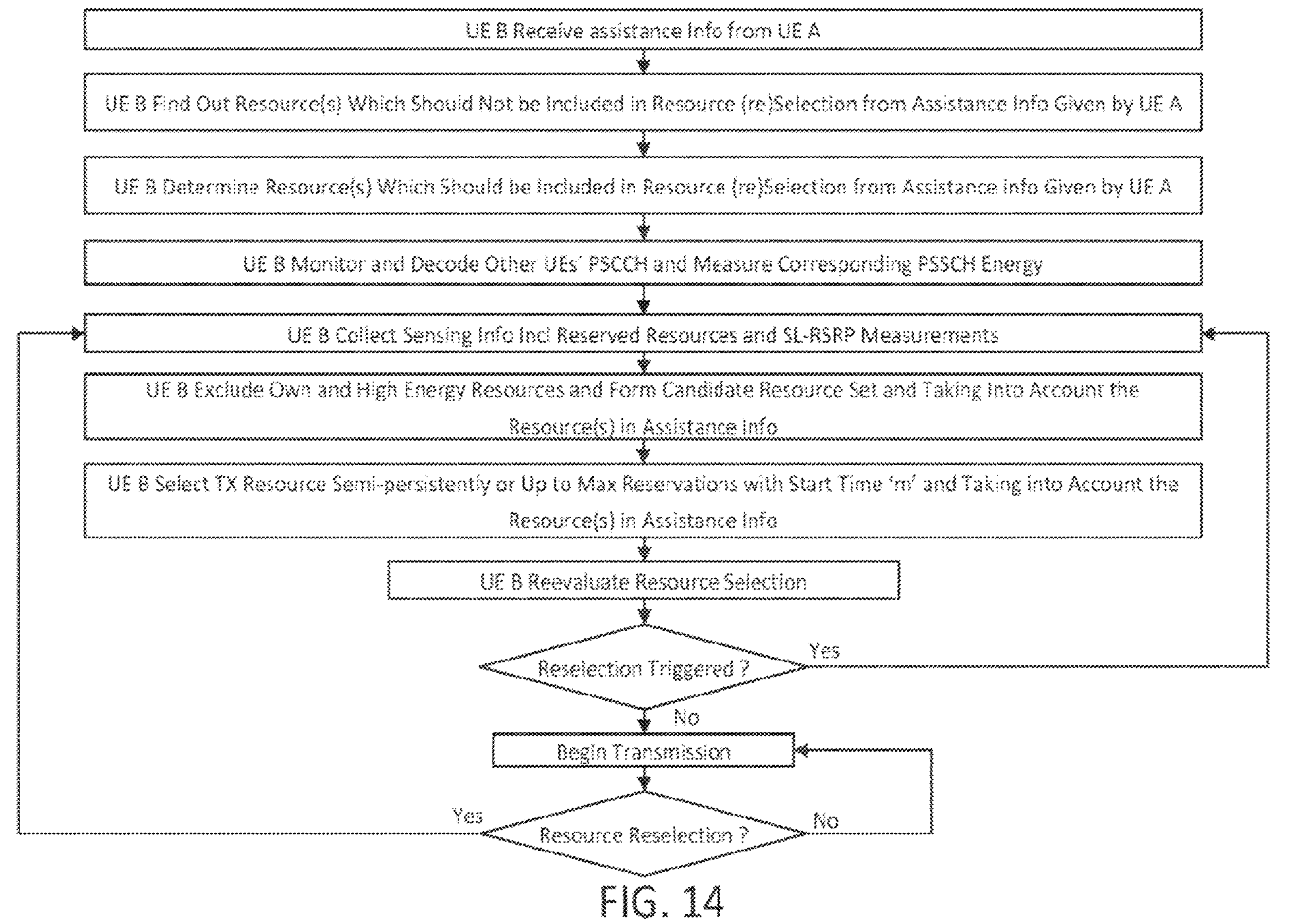
FIG. 14 illustrates assistance information for assisting resource (re-)selection procedure in accordance with an aspect of the application.

In even another aspect, assistance information for assisting resource (re-)selection protocols is described in the exemplary embodiment depicted in FIG. 14. It is envisaged to use dual assistance information mechanism to enable more efficient operation. The UE B may send the first assistance information to UE A to assist UE A to determine coordination signaling such as scheduling information or assistance information. Once receiving UE B's assistance information, then UE A may send scheduling information to UE B. In case that there may be inter-group UE interference, UE B may perform sensing or partial sensing. For example, UE B may send assistance information regarding its sensing results to UE A. UE A may schedule UE B based on such assistance information. Alternatively, UE A may determine assistance information and send such information to UE B based on such assistance information received from UE B.

Figure 15:
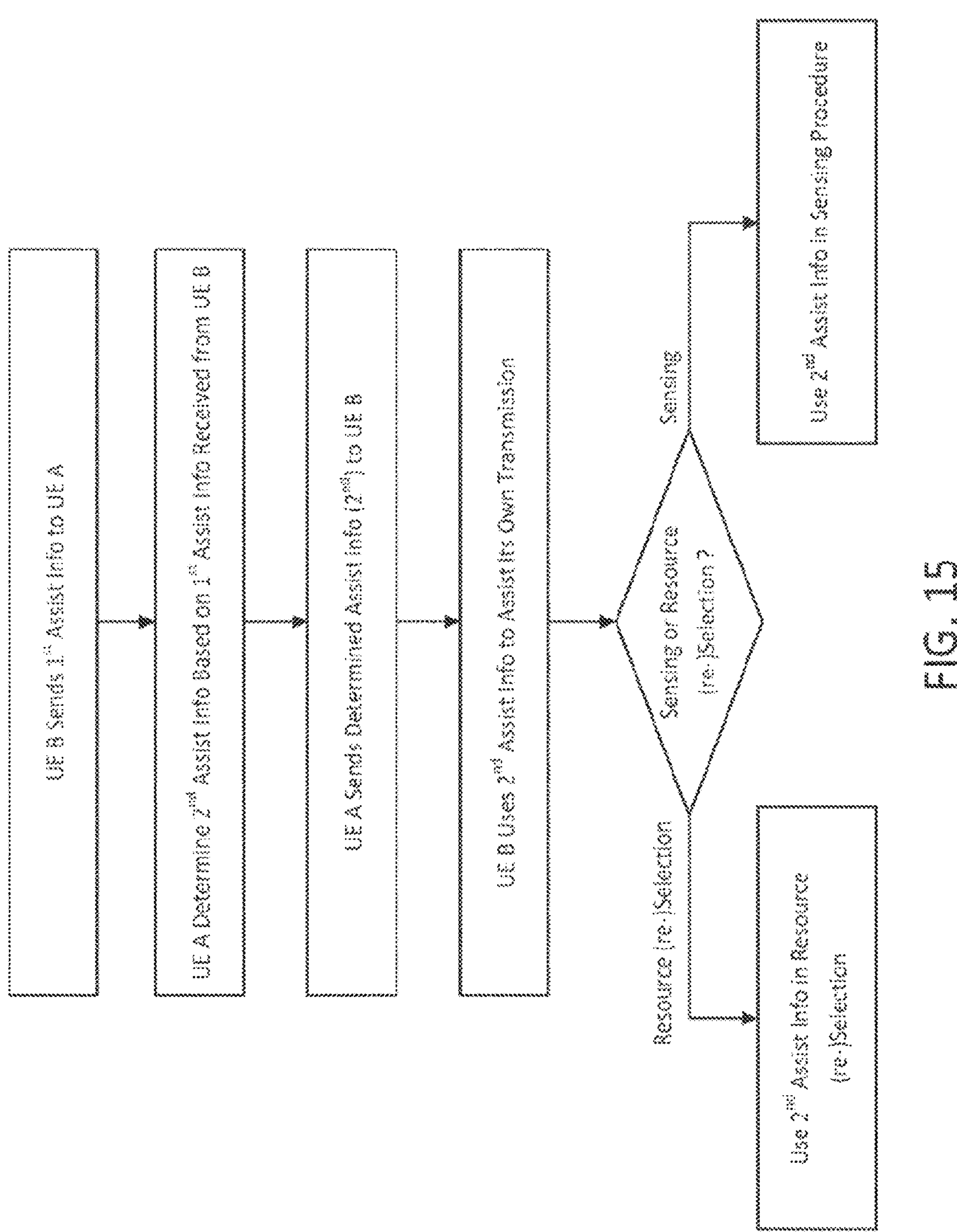
FIG. 15 illustrates a dual assistance information scheme in accordance with an aspect of the application.

In even a further aspect, dual assistance information protocols are described in the exemplary embodiment depicted in FIG. 15. UE B may send the first assistance information to UE A. UE A may determine the second assistance information based on the first assistance information received from UE B. UE A may send the determined assistance information (the second assistance information) to UE B. UE B may use the second assistance information to assist its transmission.

The assistance information may be indicated or configured either for sensing or resource (re-)selection. If the assistance information is indicated or configured for sensing, then UE B may use the second assistance information in sensing procedure. If the assistance information is indicated or configured for resource (re-)selection, then UE B may use the second assistance information in resource (re-)selection procedure. In an alternative embodiment, the assistance information is indicated or configured for both sensing and resource (re-)selection. In this case UE B may use the second assistance information in both sensing and resource (re)selection procedure.

Figure 16:
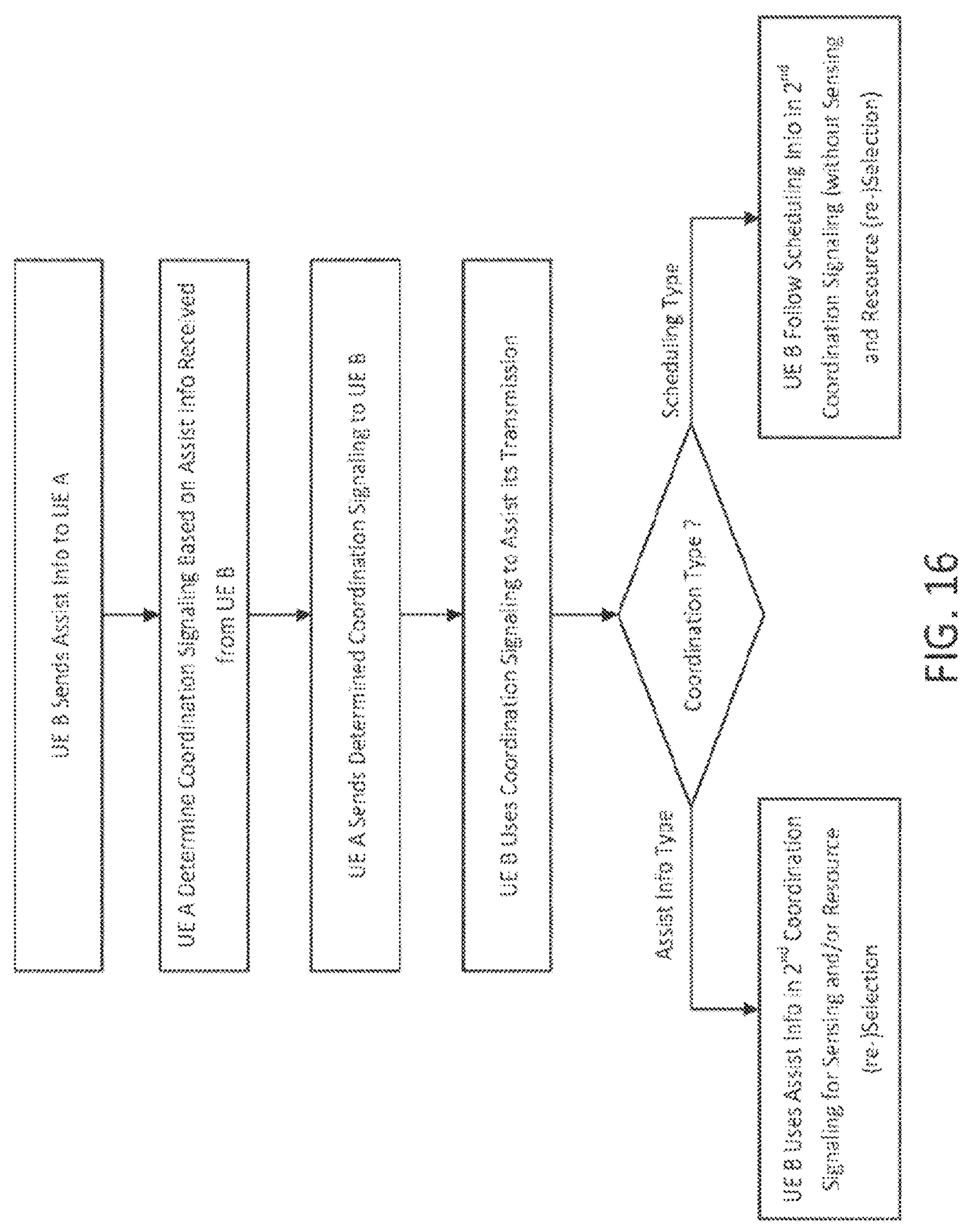
FIG. 16 illustrates coordination signaling type dependent assistance for sensing and resource (re-)selection procedure in accordance with an aspect of the application.

In yet even a further embodiment, using coordination signaling to assist sensing and/or resource (re-)selection may depend on coordination signaling type. Coordination signaling type dependent assistance for sensing and resource (re-) selection protocol is depicted in the exemplarily embodiment shown in FIG. 16. UE B may send the first assistance information to UE A. UE A may determine the coordination signaling based on the assistance information received from UE B. UE A may send the determined coordination signaling to UE B. UE B may use the coordination signaling to assist its transmission.

The coordination signaling may be indicated or configured either for scheduling type or assistance type. If the coordination signaling is indicated or configured for scheduling type, then UE B may follow scheduling information in coordination signaling. This may be associated with or without sensing and resource (re-)selection. If the coordination signaling is indicated or configured for assistance type, then UE B may use assistance information in coordination signaling for sensing and/or resource (re-)selection.

The UE may select the earliest resource in the indicated set of resource provided in assistance information. UE may select the second earliest resource in the indicated set of resource provided in assistance information. UE may select the earliest resource in the set of resource which may or may not be provided in assistance information. This may reduce the latency.

Groupcast Based Inter-UE Coordination

Figure 17:
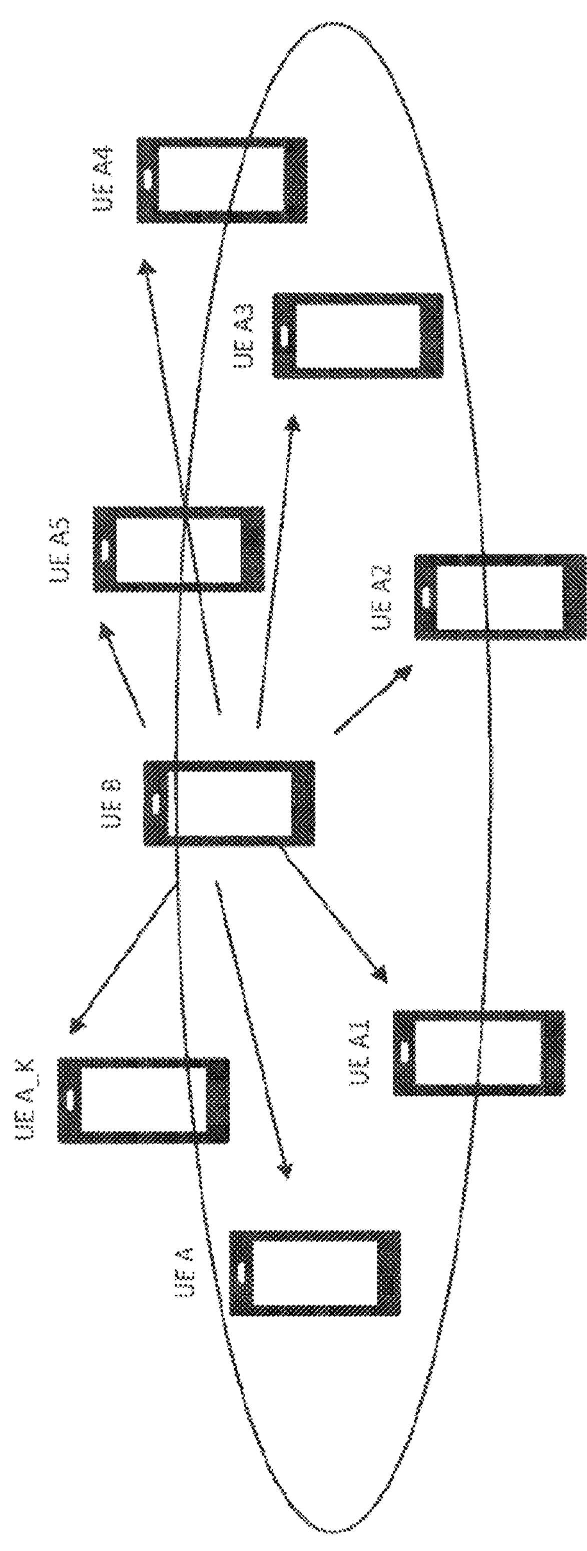
FIG. 17 illustrates Groupcast in NR Sidelink in accordance with an aspect of the application.

According to even another aspect, methods, and architectures are provided to enable inter-UE coordination for different cast types including groupcast are required. In Rel-16, V2X with NR Sidelink is supported. Groupcast is also supported in addition to unicast and broadcast. In groupcasting, UE B may be a transmitting UE and multiple UE As may be the receiving UEs. UE B may be groupcasting to UE As. This is exemplarily shown in FIG. 17. Further aspects may include but is not limited to configuring or indicating a portion of UEs to provide assistance information; to enable mixed types of coordination including to configure some UEs to provide assistance information and some UEs to provide scheduling information; to enable multi-type operation including to configure UEs to provide both scheduling information and assistance information, randomly select some UEs to provide coordination signaling where uniform or non-uniform random distribution may be indicated, (pre-) configured and/or used to configure one UE in a subgroup to provide assistance information e.g., based on geographical area or location, to configure one subgroup lead to collect and aggregate information and send aggregated information to UE B, or the like. In addition, coordination signaling from multiple inter-UEs (e.g., multiple UE A) may be handled and processed.

One embodiment may configure or indicate a subset or a portion of UEs (e.g., UE As) to provide assistance information. This may reduce signaling overhead. Another solution may use mixed type of coordination signaling and may be to configure or indicate a mixed type of coordination signaling for different UEs. For example, a subset or a portion of UEs (e.g., UE As) may be configured or indicated to provide assistance information, and another subset or portion of UEs (e.g., UE As) may be configured or indicated to provide scheduling information, and so on.

Yet another embodiment may employ multi-types coordination signaling. A UE may be configured or indicated a multi-type of coordination signaling. For example, a UE may be configured or indicated to report a scheduling information and assistance information at the same time for coordination signaling.

Yet another embodiment may use random selection to determine which UE may provide the assistance information. This may be performed by gNB or autonomous by UE. This may be either uniform or non-uniform random distribution. For example, UE may (autonomously) decide to provide or not e.g., randomly or based on a non-uniform random distribution. A threshold may be configured or indicated to control the random distribution.

Yet another solution may be based on locations or geographic areas. A group of UEs may be configured or indicated to provide assistance information. One UE in a subgroup may be configured or indicated to provide assistance information e.g., based on geographical area or location.

Yet another solution may be to configure one subgroup lead to collect and aggregate assistance information and send the aggregated assistance information to UE B.

Yet another solution, scheduling information may be configured or indicated, and UE B may check if aggregated scheduling information has overlap or not. If yes, i.e., aggregated scheduling information has overlap, then UE B may select the scheduling information with the most overlap. For example, the scheduling information that is used by majority of UEs may be selected and used. Once UE B determines the scheduling information to be used, UE B may send the determined scheduling information in the first stage SCI to UE As. UE B may override the scheduling information provided by UE As and send completely different scheduling information e.g., not even in any scheduling information from UE A or not in the overlap from the UE As.

Assistance information may be configured and used. UE B may select the one with the most overlap, e.g., the assistance information that is used by majority of UEs. Alternatively, the components and/or types of assistance information that overlap may be selected by UE B. For example, if "half duplex" information component has the most overlap, then it may be included. Secondary overlap may be "exposed node," "hidden node," or "collision," etc.

If M components should be used, then select the first M information components that overlap the most. For example, M may be two, "half duplex" information component and "hidden node" information component may be selected if these two have the most overlap reported from UE As. If information components have no overlap, then one option may be not to use any of them.

Another option may be to randomly select one or some of them to process for transmission. Majority rule may still apply. The goal may be to satisfy most inter-UEs as much as possible. Best effort approach may be used.

Figure 18:
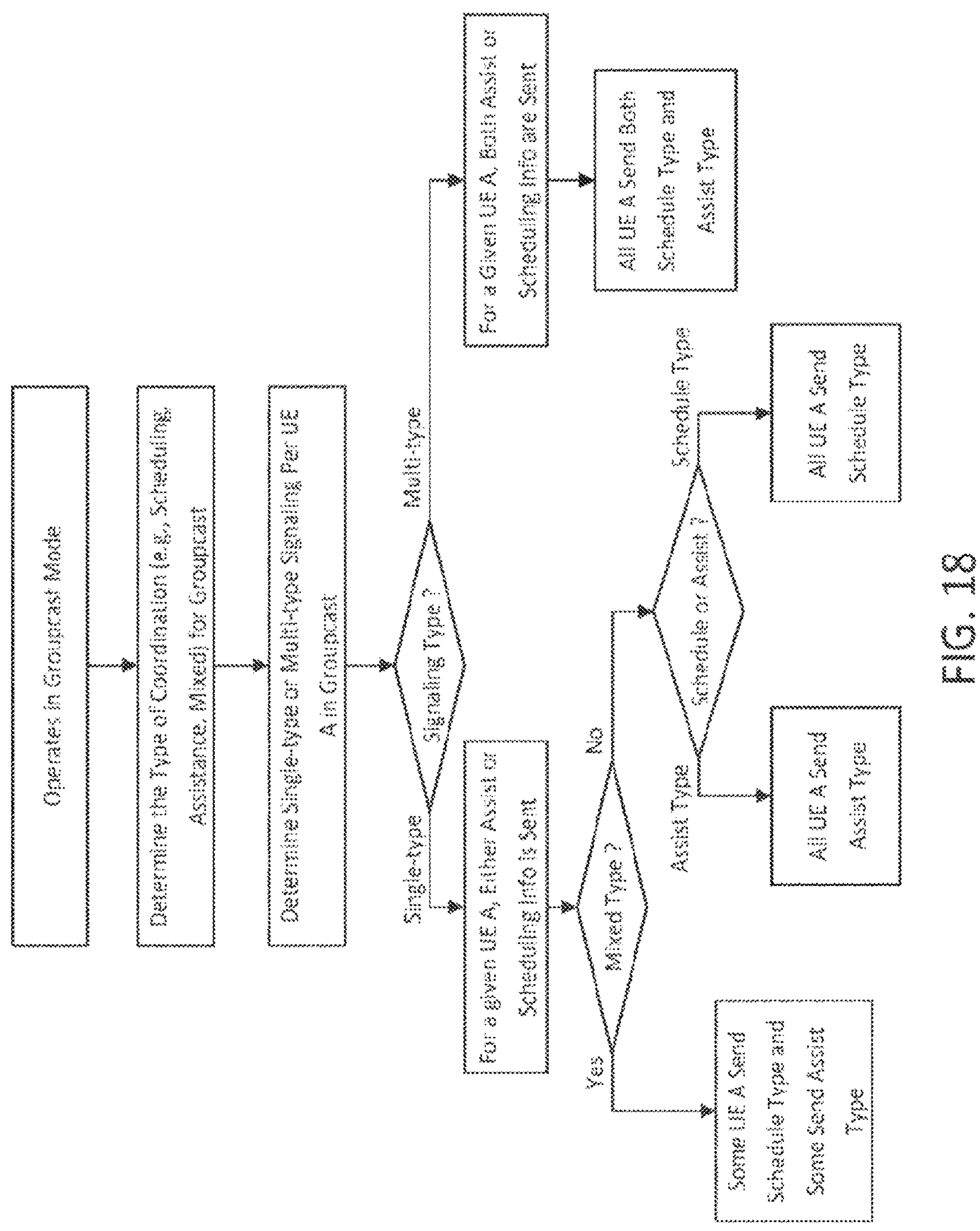
FIG. 18 illustrates a coordination mechanism for groupcast in NR Sidelink in accordance with an aspect of the application.

Coordination mechanism for groupcast is depicted in FIG. 18. To save power and latency for groupcast inter-UE operation. One solution may be to enable scheduling-based operation or schedule/assistance-based. The scheduled UEs may not need to perform sensing. This may save power since power and complexity associated with sensing procedure may be avoided.

Another solution may be to scramble the CRC in the first stage SCI with destination ID. Inter-UE (UE A) may only need to decode the first stage SCI without decoding the second stage SCI and SL data channel in PSSCH if CRC does not pass the CRC check. This may save power and latency. Inter-UE (UE B) may perform sensing. Inter-UE (UE A) may not perform sensing. This may also be applied to groupcast where grouping is formed by geographic location and destination ID may be implicitly represented by geographic information.

UE A may provide assistance information to a UE B. For example, the assistance information may indicate the presence of expected and/or potential resource conflict on the resources that is indicated by UE B e.g., by UE B's SCI and/or the presence of detected resource conflict on the resources that is indicated by UE B e.g., by UE B's SCI. An expected and/or potential resource conflict may be due to hidden node, expose node, half duplex and/or collision. An example is shown in Table 5 below.

TABLE 5

| Assistance information | Type | Information |
|---|---|---|
| Information type 1 | Hidden node | "1" present or "0" absent |
| Information type 2 | Exposed node | "1" exist or "0" not exist |
| Information type 3 | Half Duplex | "1" TX or "0" RX |
| Information type N | Collision | "1" present or "0" absence |

UE B may request assistance information from UE A, e.g., using bit combination. This is shown in Table 6 below. Each bit combination may indicate a type of assistance information to be requested and should be included in assistance information signaling.

TABLE 6

| Assistance information | Type | Bits |
|---|---|---|
| Information 1 | Hidden node | 00 |
| Information 2 | Exposed node | 01 |
| Information 3 | Half Duplex | 10 |
| Information N | Collision | 11 |

UE B may request assistance information from UE A, e.g., using bitmap. This is shown in Table 7 below.

TABLE 7

| Assistance information | Type | Bitmap b0 b1 b2 b3 |
|---|---|---|
| Information 1 | Hidden node | b0 |
| Information 2 | Exposed node | b1 |
| Information 3 | Half Duplex | b2 |
| Information N | Collision | b3 |

Another example may be to indicate there is resource conflict or not. This is shown in Table 8 below. One bit may be used for indication of resource conflict status. Bit "0" may be used to indicate "resource conflict" and bit "1" may be used to indicate "resource not conflict".

TABLE 8

| Assistance information | Type | bit |
|---|---|---|
| Information 1 | Resource conflict | 0 |
| Information 2 | Resource not conflict | 1 |

In bitmap, if b_i is "1", then this may indicate that the type of information is requested and should be included in assistance information. Otherwise, if b_i is "0", then this may indicate that the type of information is not requested and should not be included in assistance information. Assistance information size may be variable depending on which and what type and how many of assistance information is requested and included.

UE B may send request signal or channel in SCI, the first stage SCI, the second stage SCI, MAC CE, PSCCH, PSSCH, SL-SCH, RRC, or the like.

UE B may schedule UE A to send assistance information. UE B may include scheduling information in request signal or channel, and/or UE A may perform sensing and autonomously select resource to send assistance information. There may be collision but as long as sensing is good enough, collision may be minimized.

If UE A is scheduling UE, assistance information from another UE A (e.g., UE A1, UE A2, etc.) could send to UE A too. UE A may schedule UE B from transmission. UE A may also schedule another UE A(s) to send coordination signaling to UE B. UE B may perform some scheduling as well. UE As may send the assistance information to UE B (or another UE As).

Methods and solutions in previous aspects discussed above may also be used e.g., for scheduling and/or assistance operations.

Many-2-One TX/RX Based Inter-UE Coordination

Figure 19:
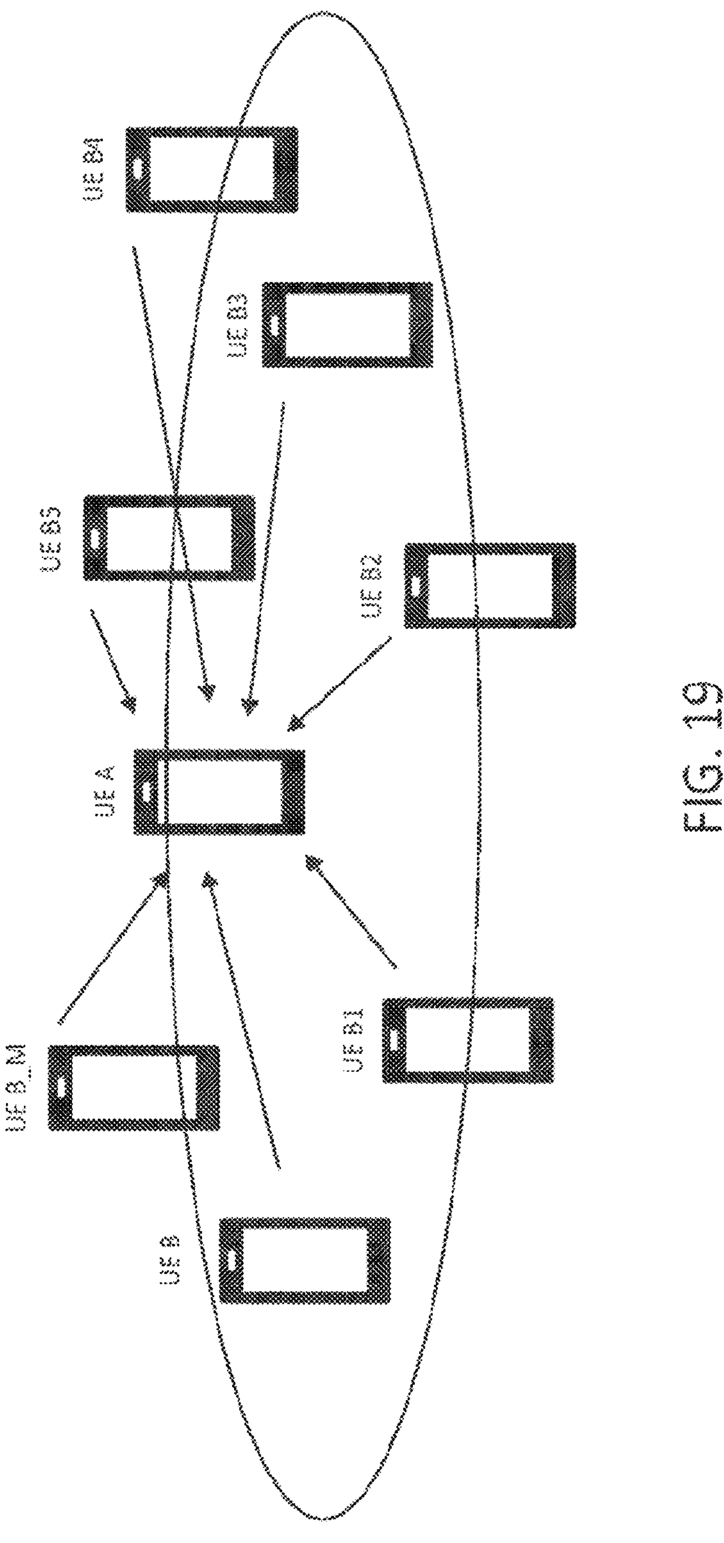
FIG. 19 illustrates an inter-UE operation with many TX UE and single RX UE communications in accordance with an aspect of the application.

There may be cases where multiple transmission UEs (e.g., UE Bs) transmit to a receiving UE (e.g., UE A). This is depicted in FIG. 19. Methods for coordination to enable efficient communications among inter-UEs are described here. UE A may send a single aggregated SCI (first stage or second stage) or multiple SCI to coordinate UE B. For example, UE A may send non-aggregated first stage SCI and aggregated second stage SCI to UE Bs. UE A may send aggregated first stage SCI and non-aggregated second stage SCI to UE Bs. Alternatively, UE A may send aggregated formats for both first stage SCI and second stage SCI to UE Bs.

UE A may schedule multiple UE Bs for transmission at the same time. UE A may send multiple SCIs. For example, UE A may send multiple PSCCHs. UE A may send multiple first stage SCIs. Each UE B may decode the first stage SCI and locate the second stage SCI according to the first stage SCI.

UE A may schedule multiple PSSCH transmissions from multiple UE Bs. UE A may also schedule multiple second stage SCI and SL-SCH transmissions from multiple UE Bs. UE A may send a SCI which may schedule K UE Bs simultaneously. K time/freq resource fields may be configured e.g., by gNB or coordinating UE. The size of SCI format may be configured e.g., by gNB or coordinating UE. The size of SCI control field may be indicated or configured e.g., by gNB or coordinating UE. The presence and absence of SCI control field may be indicated or configured e.g., by gNB or coordinating UE.

The time/freq resources may be configured in the first stage SCI. The size of the first stage SCI format may be configured to accommodate scheduling information. Alternatively, the time/freq resources may be configured in the second stage SCI. The size of the second stage SCI format may be configured to accommodate scheduling information.

Resource allocation for reception may be configured in the first stage SCI. Resource allocation for transmission may be configured in the second stage SCI. Alternatively, resource allocation for transmission may be configured in PSSCH.

UE A may use groupcast to provide coordination signaling including scheduling information, assistance information or both. For example, scheduling information may be delivered in SCI and assistance information may be delivered in data channel in PSSCH. For another example, both scheduling and assistance information may be delivered in SCI and size of SCI may be configured or increase to accommodate both scheduling and assistance information.

Figure 20:
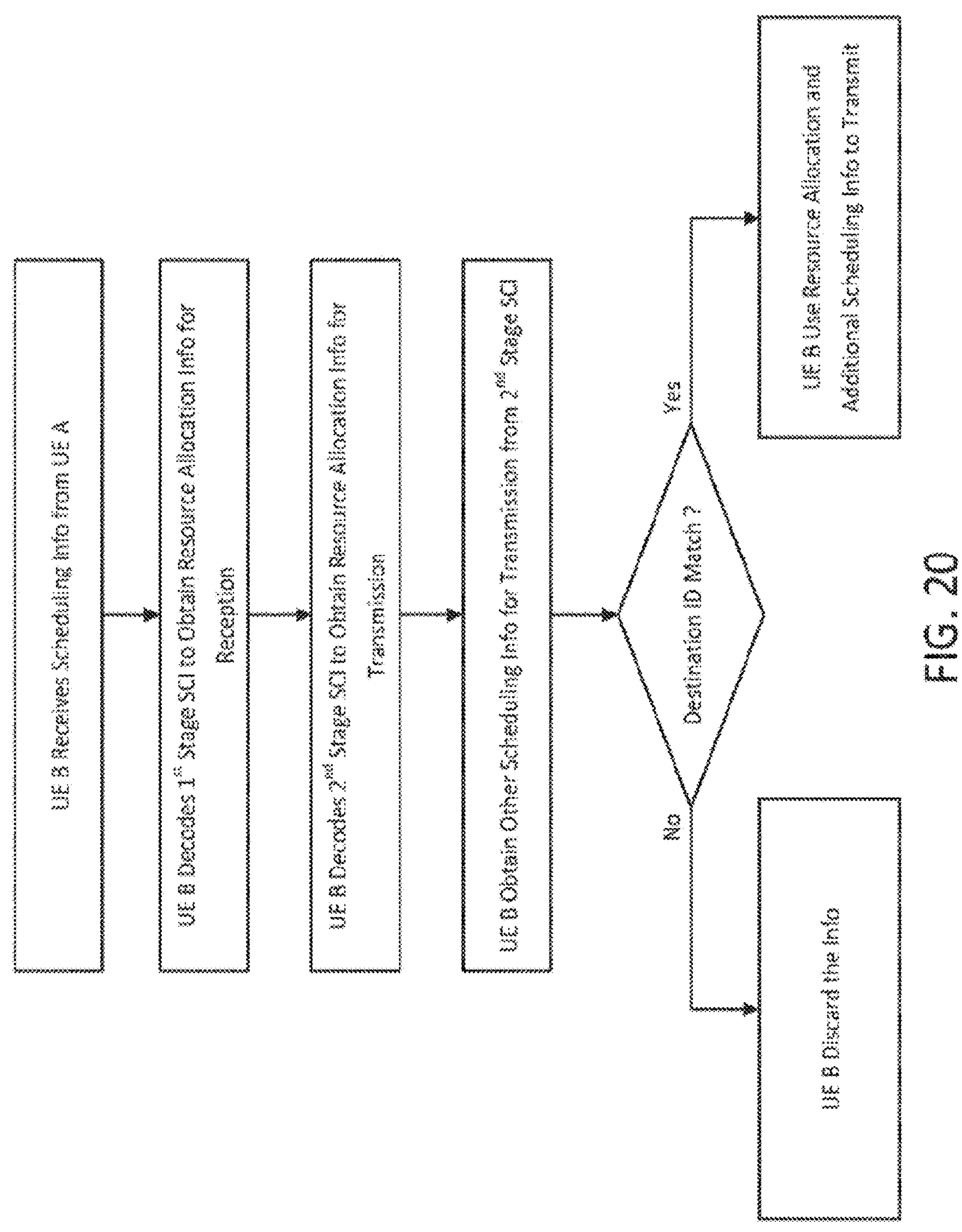
FIG. 20 illustrates scheduling using groupcast scheme in accordance with an aspect of the application.
Figure 21:
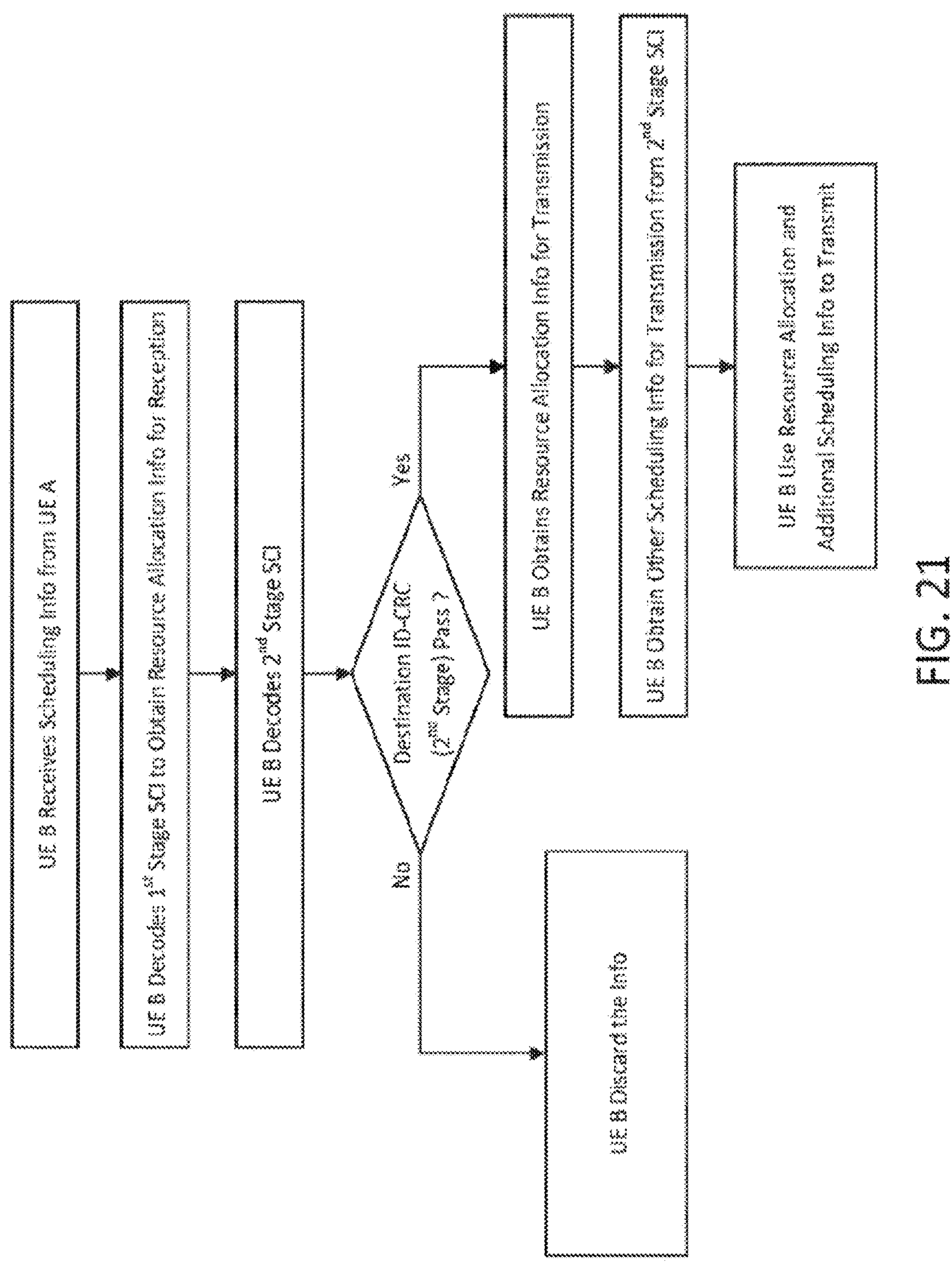
FIG. 21 illustrates scheduling using groupcast scheme with scrambled CRC in second stage SCI in accordance with an aspect of the application.

As shown in in FIG. 20, UE A may send coordination signaling to UE Bs. UE B may decode first stage SCI. Moreover as shown in FIG. 21, scheduling using groupcast scheme with scrambled CRC in second stage SCI. CRC in the second stage SCI may be scrambled with destination ID. Control field of destination ID may be repurposed for other usage.

UE A may schedule UE B by sending scheduling information in SCI and UE B (UE B1) pass that scheduling information via SCI to another UE B (UE B2). Alternatively, UE B (UE B1) may send data to UE A based on scheduling information sent by UE A. Once UE A receive it, it may forward it to another UE B (UE B2). Or UE A may decode it and resend it to UE B2 with different transmission parameters e.g., MCS, etc. UE B2 may decode SCI and decode corresponding PSSCH.

Polar code may be used for SCI encoding and decoding including first stage in PSCCH and second stage SCI in PSSCH. LDPC may be used for PSSCH encoding and decoding.

UE A may send assistance information to UE B. In addition, UE Bs may send assistance information to UE A. UE B may request type of coordination signaling—scheduling information or assistance information. UE A may process as follows:

If majority of UEs request scheduling information, then UE A may switch to use scheduling information. If majority of UEs request assistance information, then UE A may switch to use assistance information.

Alternatively, UE A may send mixed type to UE Bs. For example, UE A may send scheduling information to some UE B and assistance information to another UE B based on their request.

The scenario may be one UE A but multiple UE Bs. Multiple UE Bs may transmit to a single UE A. UE A may provide assistance information to multiple UE Bs to assist UE B's transmission. Assistance information may include a set of resources and additional other information. Multiple UE Bs may use separate resources or resource pools. Multiple UE Bs may share same resources or resource pools. UE Bs may perform sensing and autonomously select resources. Collision may happen.

Solution may be to use scheduling information instead of assistance information. UE A may be configured by gNB. The first stage SCI, the second stage SCI and/or PSSCH may be used to deliver scheduling information. Once UE Bs receive scheduling information, they will transmit in corresponding resources without collision. UE B may not need to perform sensing at all or perform only partial sensing or limited sensing or the like. UE A may perform sensing and UE B may not. If UE B's transmission cause interference to UE B of other group, collision may happen. However, if UE B of other group is transmitting, then no collision may occur. We propose to exchange coordination information between groups. This may mitigate half duplex and expose node. If UE B of other group is receiving, then there may be collision. There may be hidden node issue. To solve the problem, UE B may provide hidden node, half duplex, exposed node status as part of assistance information to their UE A. Between UE As, such assistance information should be exchanged, e.g., via gNB or via direct link between UE As. In coverage, exchanging information via gNB may be performed. If out of coverage, exchanging information via direct link between UE As may be conducted. With information exchanging, this may mitigate or avoid interference between different groups.

UE A may be configured by gNB, and UE B may be configured by coordinating UE. Destination ID may be carried in SCI either implicitly by scrambling CRC with destination ID or explicitly carried in SCI either in first stage or second stage SCI.

Mutual Link Based Inter-UE Coordination

When there are multiple transmission UEs (e.g., UE Bs) and a single receiving UE (e.g., UE A), inter-UE operation may also involve with communications between inter-UEs, i.e., communications (mutual link) between UE Bs. Such communications may be either direct or indirect depending on the designs. It is important to enable communications between inter-UEs during inter-UE operation. Efficient method and system as well as mechanism to enable efficient communications among inter-UEs are needed and corresponding solutions are proposed.

One solution may be that UE A may send a single scheduling information to transmitting UE B and schedule UE B's transmission to another UE B. UE B may use the received scheduling information to schedule another UE B's (e.g., UE B1's) reception.

Another solution may be that UE A may send a single scheduling information to the transmitting UE B and the receiving UE (e.g., UE B1) to schedule UE B's transmission and another UE B's (e.g., UE B1's) reception.

Another solution may be that UE A may send multiple (e.g., two) scheduling information to the transmitting UE B and the receiving UE (e.g., UE B1) to schedule UE B's transmission and another UE B's (e.g., UE B1's) reception. UE A may send a first scheduling information to transmitting UE B to schedule UE B's transmission and may send a second scheduling information to receiving UE (e.g., UE B1) for another UE B's (e.g., UE B1's) reception.

Yet another solution may be that UE A may send a single scheduling information to transmitting UE B and schedule UE B's transmission and UE B may schedule another UE B's (e.g., UE B1's) reception. UE A may set TX/RX indicator to TX for the scheduling information and time/freq resources in SCI format may be interpreted for transmission at UE B. UE B may send the scheduling information and time/freq resources in SCI format which may be interpreted for reception at another UE B (e.g., UE B1). UE B may set TX/RX indicator to RX for the scheduling information and time/freq resources in SCI format Yet another solution may be that UE A may send a single (aggregated) SCI, PSCCH or scheduling information to transmitting UE B and schedule UB's transmission and another UE B's reception. UE A may set a first TX/RX indicator to TX for the first control field, scheduling information and time/freq resources in SCI format which may be interpreted for transmission at UE B. UE A may set a second TX/RX indicator to RX for the second control field, scheduling information and time/freq resources in SCI format which may be interpreted for reception at another UE B. The scheduling information and time/freq resources in SCI format may be interpreted for reception at another UE B (e.g., UE B1).

Yet another solution may be that UE A may send two (or multiple) SCI, PSCCH or scheduling information to the transmitting UE B and the receiving UE (e.g., UE B1) to schedule UE B's transmission and another UE B's (e.g., UE B1's) reception. UE A may send a first SCI, PSCCH or scheduling information to transmitting UE B to schedule UE B's transmission and may send a second SCI, PSCCH or scheduling information to receiving UE (e.g., UE B1) for another UE B's (e.g., UE B1's) reception. UE A may set TX/RX indicator to TX for a first SCI, PSCCH or scheduling information. UE A may set TX/RX indicator to RX for a second SCI, PSCCH or scheduling information.

One solution may use indirect link and may use UE A to coordinate the indirect communication. UE A may send a scheduling information to transmitting UE B and schedule UE B's transmission to UE A. UE A may send another scheduling information to another receiving UE B (e.g., UE B1) and schedule another UE B's reception.

One solution may use both direct and indirect links and may use UE A to coordinate the direct and/or indirect communication. UE A may send a scheduling information to transmitting UE B and schedule UE B's transmission to UE A. UE A may send another scheduling information to another receiving UE B (e.g., UE B1) and schedule another UE B's reception. UE A may send another scheduling information to transmitting UE B and schedule UE B's transmission to another UE B. UE B may use the received scheduling information to schedule another UE B's (e.g., UE B1's) reception. This may achieve diversity gain.

Another solution may be that UE A may send a scheduling information to transmitting UE B and schedule UE B's transmission to UE A and UE B's transmission to another UE B. UE B may use the received scheduling information to schedule another UE B's (e.g., UE B1's) reception. The received scheduling information may be the same (or different). UE A may send another scheduling information to another (same) receiving UE B (e.g., UE B1) and schedule another (same) UE B's reception. This may achieve overhead reduction and diversity gain.

Yet another solution may be that UE A may send two types of scheduling information to transmitting UE B. UE A may set TX/RX indicator to RX for the first scheduling information and interpret time/freq resources in SCI format as reception at UE B from UE A. UE A may set TX/RX indicator to TX for the second scheduling information and interpret time/freq resources in SCI format for transmission to another UE B.

Yet another solution may be that UE A may send multiple mixed types scheduling information to transmitting UE B, UE A may set TX/RX indicator to RX for the first scheduling information and interpret time/freq resources in SCI format as reception at UE B from UE A. UE A may set TX/RX indicator to TX for the second scheduling information and interpret time/freq resources in SCI format for transmission to another UE B. UE A may set TX/RX indicator to RX for the third scheduling information and interpret time/freq resources in SCI format for transmission to another UE B for reception at another UE B.

UE A may provide coordination signaling to UE B1. UE A may send scheduling information to UE B1. If UE A wants to schedule UE B1's transmission to another UE (e.g., UE A1), UE A may only need to send SCI to UE B1 without associated data channel. UE A may include time resource and frequency resources information in SCI fields time resource assignment and frequency resource assignment for UE A1 to receive. Alternatively, UE A may send both SCI and associated data channel to UE B1 with scheduling information included in associated data channel.

gNB and/or UE A may configure the receiving UE. UE A may include destination ID of receiving UE (e.g., UE A1) in first stage SCI. For example, UE A may set source ID to be destination ID of UE (e.g., UE A1). UE A may include TX/RX indicator in SCI field and set TX/RX indicator to be "TX".

When UE A may set the indicator to "TX", the time resource and frequency resources that are indicated in SCI fields time resource assignment and frequency resource assignment should be used for transmission for PSSCH to UE A1.

UE B1 may receive SCI and/or associated data channel. Once UE B1 decodes the first stage SCI, UE B1 may know the time/freq resources for transmission to UE A1. UE B1 may also decode the second stage SCI to know it is the destination for the second SCI. UE B1 may also decode the second stage SCI to know which UE it should transmit to. UE B1 may use source ID in the second stage SCI to transmit the PSSCH.

UE B1 may transmit to UE A1 after receiving the coordination signaling from UE A. If UE A1 is configured e.g., by gNB to be the receiving UE from transmitting UE B1, then UE B1 may set destination ID to be UE A1 in the second stage SCI based on the configuration or indication. UE B1 may pass time resource and frequency resources that are indicated in SCI fields time resource assignment and frequency resource assignment which it receives from UE A to its own SCI transmission to UE A1. UE B1 may set other decoding parameters for UE A1 reception accordingly.

Solution may include transmission via UE A or transmission directly between UE Bs. If transmission is via UE A, collision may be avoided. If transmit directly between UE Bs, collision may happen. To avoid the collision, UE A may control the transmission for one UE B to another UE B. This may be similar to mode 1 but scheduling is performed by UE A.

Method 1 may be to enable direct UE B communication. This may be achieved via UE A scheduling and assistance. Proper PSCCH/PSSCH transmission may be designed. Method 2 may be to enable indirect UE B communication.

In method 1, one alternative may be to use a single scheduling information and sent to UE B. UE B may reuse the same scheduling information and sent this scheduling information to another UE B. Another solution may be to use two scheduling information—one for transmitting UE and the other for receiving UE. UE B may receive the scheduling for transmission and another UE B may receive scheduling information for reception. In this case, the transmitting UE B may not send SCI or scheduling information to receive UE. Both scheduling information for transmission and reception are sent by UE A.

Multiple scheduling information may be performed and sent to a single UE or to both transmitting UE and receiving UE.

SCI format for scheduling is shown in Table 8. The first stage SCI with a new SCI format 1-C may be introduced and used. UE B may receive first stage SCI and decode format 1-C and/or second stage SCI and decode format 2-A or format 2-B. Alternatively, a new format 2-C may be introduced. After successful decoding, UE B may check the TX/RX flag in SCI filed x, if the flag indicates "TX", then time domain and frequency domain resources that are indicated in SCI field y should be used for transmission for PSCCH/PSSCH. Otherwise, if the TX/RX flag indicate "RX", then time domain and frequency domain resources that are indicated in SCI field y1 and y2 should be used for reception for PSCCH/PSSCH.

It is envisaged according to the application to have multiple coordination modes in a system.

Configuration 1: UE A may send a single scheduling information to transmitting UE B; UE A may set TX/RX indicator to RX for the first scheduling information and interpret time/freq resources in SCI format as reception at UE B from UE A.

Configuration 2: UE A may send two scheduling information to transmitting UE B; UE A may set TX/RX indicator to RX for the first scheduling information and interpret time/freq resources in SCI format as reception at UE B from UE A. UE A may set TX/RX indicator to TX for the second scheduling information and interpret time/freq resources in SCI format for transmission to another UE B.

Configuration 3: UE A may send three scheduling information to transmitting UE B, UE A may set TX/RX indicator to RX for the first scheduling information and interpret time/freq resources in SCI format as reception at UE B from UE A. UE A may set TX/RX indicator to TX for the second scheduling information and interpret time/freq resources in SCI format for transmission to another UE B. UE A may set TX/RX indicator to RX for the third scheduling information and interpret time/freq resources in SCI format for transmission to another UE B for reception at another UE B.

SCI format and size may be configured to proper size and format based on the configuration.

The example shows two scheduling information, e.g., between UE B 1 and UE B2. If UE B1 is TX UE and UE B2 is RX UE, then UE B1 should use SCI field y1 for TX row and UE B2 should use SCI filed y2 for RX row in Table 9 below. On the other hand, if UE B1 is RX UE and UE B2 is TX UE, then UE B1 should use SCI field y1 for RX row and UE B2 should use SCI filed y2 for TX row in Table 9 below. In this case, UE B1 may not need to send SCI e.g., first stage SCI and only send second stage SCI, or UE B1 may not send any SCI (including both first and second stage SCI) and only transmit data in PSSCH.

This should be performed once UE B (either UE B1 or UE B2 e.g., as reception UE) decodes second stage SCI and figure out the destination ID. This may also be extended to more than two UE Bs.

TABLE 9

| SCI field x - TX/RX flag | SCI field y1 | SCI field y2 |
|---|---|---|
| TX | Indicated time/freq resource is used for TX1 | Indicated time/freq resource is used for TX2 |
| RX | Indicated time/freq resource is used for RX1 | Indicated time/freq resource is used for RX2 |

TABLE 10

| SCI field x - TX/RX flag | SCI field y1 | SCI field y2 |
|---|---|---|
| TX | Indicated time/freq resource in first stage SCI and parameters in second stage SCI is used for TX1 | Indicated time/freq resource in first stage SCI and parameters in second stage SCI is used for TX2 |
| RX | Indicated time/freq resource in first stage SCI and parameters in second stage SCI is used for RX1 | Indicated time/freq resource in first stage SCI and parameters in second stage SCI is used for RX2 |

In method 2, one UE B may send data to UE A and UE A may pass the data to another UE B. In method 2, another alternative is that single scheduling information may be performed. In this case, when UE B1 wants to send to UE B2, UE A may provide schedule information to UE B1, and UE B1 may perform sensing and select resource, then send both PSCCH and PSSCH to UE B2.

A new SCI format e.g., SCI format 2-y or SCI format 2-C may be introduced. The indication of SCI formats may be carried in the first stage SCI with the second-stage SCI formats indication as shown in Table 11 below.

TABLE 11

| Value of second-stage SCI format field | second-stage SCI format |
|---|---|
| 00 | SCI format 2-A |
| 01 | SCI format 2-B |
| 10 | SCI format 2-C (SCI format 2-y) |
| 11 | Reserved |

To enable different cast types with or without inter-UE coordination, cast type/inter-UE coordination indicator may be used. An example of cast type/inter-UE coordination indicator is depicted in Table 12 below.

TABLE 12

| Value of Inter-UE coordination enable/disable indicator | Value of Cast type indicator | Cast type and Coordination enable/disable |
|---|---|---|
| 0 | 00 | Broadcast, inter-UE coordination disabled |
| 0 | 01 | Groupcast when HARQ-ACK information includes ACK or NACK, inter-UE coordination disabled |
| 0 | 10 | Unicast, inter-UE coordination disabled |
| 0 | 11 | Groupcast when HARQ-ACK information includes only NACK, inter-UE coordination disabled |
| 1 | 00 | Broadcast, inter-UE coordination enabled |
| 1 | 01 | Groupcast when HARQ-ACK information includes ACK or NACK, inter-UE coordination enabled |
| 1 | 10 | Unicast, inter-UE coordination enabled |
| 1 | 11 | Groupcast when HARQ-ACK information includes only NACK, inter-UE coordination enabled |

An example of cast type/coordination type indicator is depicted in Table 13 below.

TABLE 13

| Value of Inter-UE coordination type indicator | Value of Cast type indicator | Cast type and Coordination type |
|---|---|---|
| 0 | 00 | Broadcast, inter-UE coordination assistance type |
| 0 | 01 | Groupcast when HARQ-ACK information includes ACK or NACK, inter-UE coordination assistance type |
| 0 | 10 | Unicast, inter-UE coordination assistance type |
| 0 | 11 | Groupcast when HARQ-ACK information includes only NACK, inter-UE coordination assistance type |
| 1 | 00 | Broadcast, inter-UE coordination schedule type |
| 1 | 01 | Groupcast when HARQ-ACK information includes ACK or NACK, inter-UE coordination schedule type |
| 1 | 10 | Unicast, inter-UE coordination schedule type |
| 1 | 11 | Groupcast when HARQ-ACK information includes only NACK, inter-UE coordination schedule type |

For inter-UE coordination a set of resources determined at UE-A could be sent to UE-B in mode 2. UE-B may take this information into account in the resource selection for its own transmission. We may consider a set of resources that is preferred for UE-B's transmission, e.g., resource set which is preferred for UE-A's reception. In addition, we may also consider resource set which is preferred not to be used by UE-B's transmission, e.g., resource set that is not preferred for UE-A's reception. In case of groupcast we may also need to consider a set of resources that is preferred for other intended receivers of UE-B's transmission. In addition, we may also consider resource set that is not preferred for other intended receiver(s) of UE-B's transmission.

The resource set may refer to the resources in the past, in the future, or in both past and future as long as they may assist UE B's transmission. UE-A could determine "a set of resources" at least based on sensing procedure.

The set of resources could be carried either at the physical layer or at higher layers. How to determine which/what channel to carry the set of resource could depend on the payload size, priority and/or latency. For example, if payload size is small, the set of resources could be carried at the physical. On the other hand, if payload size is large, the set of resources could be carried at the higher layer. Alternatively, if payload size is small, the set of resources could be carried in PSCCH. If payload size is large, the set of resources could be carried in PSSCH. When fast signaling is required, the set of resources could be carried at the physical. When fast signaling is not required and payload size is large, the set of resources could be carried at the higher layer.

Either periodic, aperiodic, semi-persistent methods to transmit the set of resources could be considered. The set of resources may be requested by UE B. UE B may request different types of resources or information. For example, UE B may request the set of resources that is good to avoid hidden-node problem, exposed-node problem, half duplex problem, or a combination of them, etc. The coordination information may be requested by UE B. UE B may request different types of coordination information. Different types of coordination information could include scheduling type or assistance type information.

A set of resources may be an exact resource, a subset of resource from resource pool or the resource pool itself. A set of resources could also be more than one resource pools.

UE-B could take "a set of resources" into account in the sensing and resource (re-)selection procedures for its own transmission. Other assistance and/or coordinating information other than a set of resources could be supported if needed. UE B may request different type of information including the set of resources with and without other assistance information.

Inter-UE coordination may be supported in all cast types including unicast, groupcast and broadcast to enable the enhancement for reliability and latency for different cast types. At least unicast and groupcast should be supported. Different coordination signaling or information could be used for different cast types. A unified coordination signaling or information for different cast types or all cast types could also be used.

Inter-UE coordination may also consider partial sensing to enable power consumption reduction or power saving. Partial sensing could be considered for UEs, e.g., UE A and/or UE B.

When a set of resources determined at UE-A is sent to UE-B in mode 2 and UE-B may take into account the information in the sensing and/or resource selection for its own transmission. UE-A could send information of a set of resources to UE-B based on explicit signaling, e.g., trigger or request signaling. UE-A could send information of a set of resources to UE-B based on implicit indication, e.g., based on a pre-defined or (pre)configured triggering condition(s). Combination of both implicit indication and explicit signaling could also be considered. UE A could send coordination signaling or coordination information based on triggering, request signal and/or predefined or (pre-)configured conditions. Coordination signaling or coordination information may contain a set of resources and other assistance information.

For example, UE A could send coordination signaling or coordination information including information for a set of resources periodically e.g., in PSCCH, aperiodically, e.g., in PSSCH, or semi-persistently. Whether to use periodic or aperiodic could depend on payload size of coordination signaling or coordination information. If payload size of coordination signaling or coordination information is large, then aperiodic transmission or reporting of coordination signaling or coordination information could be used. On the other hand, if payload size of coordination signaling or coordination information is small, then periodic transmission or reporting of coordination signaling or coordination information could be used.

The aspects of hidden-node problem, exposed-node problem, half duplex problem and consecutive packet loss may be considered. Resource collision such as time-frequency resource overlapping and/or time resource overlapping that is caused by the reason other than hidden-node problem could also be considered.

Information could be of different type(s) including scheduling type information or assistance type information for inter-UE coordination for mode 2. For example, assistance type information could include a set of resource that is provided by UE A and could be used for sensing and/or resource (re-)selection at UE B for inter-UE coordination. Assistance type information could include other assistance information if needed in addition to a set of resources for inter-UE coordination. Scheduling type information could include the exact resource that is used for scheduling UE B's transmission for inter-UE coordination and operation. Which channel to carry a set of resources could be determined based on payload size of information. In case of scheduling type coordination, the scheduling capability for both transmission and reception for UEs should be supported. For example, supporting of transmission in addition to reception for UEs may be considered. An indicator could be included in SCI to distinguish between transmission and reception to enable the scheduling of UEs for transmission/reception.

Information could be of different type(s) including scheduling type information or assistance type information for inter-UE coordination for mode 2. Assistance type information could include a set of resource that is provided by UE A and could be used for sensing and/or resource (re-) selection at UE B for inter-UE coordination. Assistance type information could include other assistance information if needed in addition to a set of resources for inter-UE coordination. Scheduling type information could include exact the resource that is used for scheduling UE B for inter-UE coordination. Which channel to carry a set of resources could be determined based on payload size of information. Whether to use periodic or aperiodic to transmit a set of resources could be determined based on payload size of information. An indicator could be included in SCI to distinguish between transmission and reception for scheduling the UE. Different cast types such as unicast and groupcast could be considered for inter-UE coordination. At least unicast and groupcast should be considered for inter-UE coordination For example, for one inter-UE coordination type or scheme, a set of resources that is preferred for UE B's transmission and/or a set of resources that is non-preferred for UE B's transmission may be used for inter-UE coordination information signalling. Such information signaling may be transmitted to UE B from UE A. When a pre-defined condition(s) and/or scenario(s) or (pre-)configured condition(s) and/or scenario(s) is met, a set of resources that is preferred for UE B's transmission may be transmitted to UE B from UE A. When another pre-defined condition(s) and/or scenario(s) or (pre-)configured condition(s) and/or scenario(s) is met, a set of resources that is not preferred for UE B's transmission may be transmitted to UE B from UE A. UE A may send an explicit request for inter-UE coordination information. UE A may receive an explicit request from UE-B and may send inter-UE coordination information to the UE B. UE A may be a destination UE of a transport block transmitted by UE B. The feature may be enabled, disabled or controlled by configuration or pre-configuration. Transmission of inter-UE coordination information may be triggered by a condition other than explicit request reception.

In one example, for preferred resource set, UE B's resource(s) to be used for its transmission resource selection and/or re-selection may be based on both UE B's sensing result and the received coordination information. UE B may use resource(s) belonging to the preferred resource set in combination with its own sensing result for its resource selection and/or re-selection, UE B may use resource(s) not belonging to the preferred resource set for its resource selection and/or re-selection when certain condition(s) are met. UE-B may perform sensing and resource exclusion. In another example, UE B's resource(s) to be used for its transmission resource selection and/or re-selection may be based only on the received coordination information. UE B may use resource(s) belonging to the preferred resource set for its resource selection and/or re-selection, UE B may not support sensing and/or resource exclusion. The feature may be conditional or may be based on UE capability. In another example, for non-preferred resource set, UE B's resource(s) to be used for its transmission resource selection and/or re-selection may be based on both UE B's sensing result and the received coordination information. UE B may exclude resource(s) overlapping with the non-preferred resource set for its resource selection and/or re-selection. UE B may select or reselect resource(s) to be used for its transmission and for its resource selection and/or re-selection in case the resource(s) may be fully or partially overlapping with the non-preferred resource set. UE A may determine any resource(s) as set of resource(s) preferred for UE B's transmission if resource(s) excluding those resource overlapping with reserved resource(s) of other UE that is identified by UE A whose RSRP measurement may be larger than a predefined, (pre-) configured or indicated RSRP threshold. UE A may determine any resource(s) as the set of resource(s) preferred for UE-B's transmission if resource(s) excluding time slot(s) where UE A may not expect to perform sidelink reception from UE B in case UE A may be the intended receiver of UE-B. UE A may determine any resource(s) as the set of resource(s) that is preferred for UE-B's transmission if resource(s) may satisfy the traffic requirements of UE B. UE A may determine any resource(s) as the set of resource(s) that is not preferred for UE B's transmission if reserved resource(s) of other UE that is identified by UE-A from other UEs' SCI e.g., priority field and RSRP measurement. UE A may determine any resource(s) as the set of resource(s) that is not preferred for UE-B's transmission if resource(s) e.g., time slot(s) where UE A does not expect to perform sidelink reception from UE B in case UE A may be the intended receiver of UE-B For another example, for another inter-UE coordination type or scheme, the presence of expected or potential resource conflict on the resources that is indicated by UE B and/or the presence of detected resource conflict on the resources that is indicated by UE B e.g., by UE B's SCI, may be used for inter-UE coordination information signalling. Such information signaling may be transmitted to UE B from UE A. When a pre-defined condition(s) and/or scenario(s) or (pre-)configured condition(s) and/or scenario(s) is met, the presence of expected or potential resource conflict on the resources that are indicated by UE B may be transmitted to UE B from UE A. When another pre-defined condition(s) and/or scenario(s) or (pre-)configured condition(s) and/or scenario(s) is met, the presence of detected resource conflict on the resources that are indicated by UE B may be transmitted to UE B from UE A. A UE A may satisfy a certain conditions and may send inter-UE coordination information. UE B may receive the inter-UE coordination information from UE-A and may use it for resource selection or re-selection. The feature may be enabled, disabled or controlled by configuration or pre-configuration. A UE B may transmit PSCCH and/or PSSCH with SCI indicating the reserved resource to be used for its transmission. UE B may receive inter-UE coordination information from UE A indicating expected and/or potential resource conflict(s) for the reserved resource(s). UE B may use inter-UE coordination information to determine its own resource selection and/or re-selection.

UE A may detect the expected and/or potential resource conflict(s) on resource indicated by UE B, e.g., by UE B's SCI. UE A may send inter-UE coordination information to UE-B. UE A may be a destination UE of one of the conflicting transport blocks, i.e., the transport blocks that are to be transmitted in the expected and/or potential conflicting resource(s). UE A may be a non-destination UE of a transport block transmitted by UE-B. Whether a UE is a UE A or UE B may be configured or pre-configured. The feature may be enabled, disabled or controlled by configuration or pre-configuration. UE B may determine resource(s) to be selected or re-selected based on the received coordination information. UE B may select or reselect resource(s) that are reserved for its own transmission when expected and/or potential resource conflict on the resource(s) is indicated.

UE A may determine that expected and/or potential resource conflict occurs on the resource(s) if other UE's reserved resource(s) that are identified by UE-A may be fully or partially overlapping with resource(s) indicated by UE-B's SCI in time only or both time and frequency. In addition, UE A may determine that expected and/or potential resource conflict occurs on the resource(s) if resource(s) indicated by UE-B, e.g., UE B's SCI such as time slot(s) where UE A may not expect to perform sidelink reception from UE-B due to half duplex operation in case UE A may be the intended receiver of UE-B.

A UE e.g., transmit UE may indicate the type of UE to another UE e.g., receive UE. A UE e.g., transmit UE may indicate the type of resource allocation scheme to another UE e.g., receive UE. SCI may indicate the type of UE, e.g., power-saving UE, vehicle UE or regular UE or the like. SCI may indicate the type of resource allocation scheme, e.g., partial sensing based, the random resource selection, or full sensing or the like. An inter-UE coordination request signal may indicate a number of resources to be reported for inter-UE coordination message of UE A. An inter-UE coordination request signal may include a set or subset of resources for determining suitable resources, e.g., the preferred or non-preferred resources for UE B's transmission A destination UE of a transport block transmitted by UE B may be UE A. A non-destination UE of a transport block transmitted by UE B may be UE A. A non-destination UE may assist UE B and/or UE A for transmission and/or reception by inter-UE coordination information, assistance information or the like. The 1$^{st}$ stage SCI, the 2$^{nd}$ stage SCI, MAC CE, RRC or the like may be used to carry inter-UE coordination information. Which channel and/or signal to carry inter-UE coordination information may be indicated. For example, the 1$^{st}$ stage SCI, the 2$^{nd}$ stage SCI, MAC CE, RRC or the like to carry inter-UE coordination information may be indicated. The PSFCH, 1$^{st}$ stage SCI, the 2$^{nd}$ stage SCI, MAC CE, RRC or the like may be used to carry inter-UE coordination request signal. Which channel and/or signal to carry inter-UE coordination request signal may be indicated. For example, the PSFCH, 1$^{st}$ stage SCI, the 2$^{nd}$ stage SCI, MAC CE, RRC or the like to carry inter-UE coordination request signal may be indicated. The PSFCH, 1$^{st}$ stage SCI, the 2$^{nd}$ stage SCI, MAC CE, RRC or the like may be used to indicate the resource conflict and/or resource collision. PSFCH, 1$^{st}$ stage SCI, the 2$^{nd}$ stage SCI, MAC CE, RRC or the like may be used to indicate the half duplex status. PSFCH occasion for transmission of inter-UE coordination information, inter-UE coordination request signal, indication of the resource conflict and/or resource collision or the like may be derived by a time slot where the resource conflict occurs on PSSCH resource that is indicated by UE B's SCI. Destination ID, Source ID or the like may be carried in inter-UE coordination information, inter-UE coordination request signal, indication of the resource conflict and/or resource collision, etc. Destination ID and source ID in inter-UE coordination information, inter-UE coordination request signal and indication of the resource conflict and/or resource collision may be the IDs to identify UE for transmission and/or reception. Destination ID and source ID may be physical layer destination ID and source ID, MAC layer destination ID and source ID, higher layer destination ID and source ID, application layer destination ID and source ID or the like.

UE A may be triggered by UE B's explicit request to transmit inter-UE coordination information. UE B may provide to UE A some information in explicit request signal, e.g., number of sub-channels to be used for control and data e.g., PSSCH/PSCCH transmission in a slot, starting and ending time location of resource selection window, resource reservation interval, priority value to be used for control and data e.g., PSCCH/PSSCH transmission, or the like. UE B may receive the set of preferred resource(s) from UE A. Physical layer at UE B may report to MAC layer the intersection set between the preferred resource set from UE A and candidate resource set of sensing results at UE B. If the number of candidate resources belonging to the intersection set is larger than or equal to UE B's need, the MAC layer at UE B may use only the candidate resources belonging to the intersection set for its resource (re-) selection. Or the MAC layer at UE B may first use the candidate resource(s) belonging to the intersection set and then further use the remaining candidate resources not belonging to the intersection set for its resource (re-)selection.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A first user equipment comprising a processor, a transceiver unit, and a storage unit, and configured to:

sense a plurality of user equipment in a group to provide sidelink coordination;

determine a coordination type for each of the plurality of user equipment, wherein the coordination type is scheduled and/or assisted;

obtain transmission and reception resources for each of the plurality of user equipment;

determine the transmission and reception resources are dedicated or shared among the plurality of user equipment based on the coordination type;

determine a signaling type for each of the plurality of user equipment based on the coordination type, wherein the signaling type includes different types of assistance information with different payload sizes;

determine whether a payload size for each of the plurality of user equipment, based on the determined signaling type, exceeds a predetermined threshold; and wherein the signaling type is carried in sidelink control information (SCI) in a physical sidelink shared channel when the payload size is less than the predetermined threshold and a priority rank of the signaling type is above a predetermined level.

2. The first user equipment of claim 1, wherein the coordination type is scheduled for one of the plurality of user equipment and the coordination type is assisted for another one of the plurality of user equipment.

3. The first user equipment of claim 1, wherein the transmission and reception resources are shared.

4. The first user equipment of claim 1, configured to:

determine a priority of the plurality of user equipment based on the coordination type; and allocate a first subset of the transmission and reception resources to a first one of the plurality of user equipment, and allocate a second subset of the transmission and reception resources to a second one of the plurality of user equipment.

5. The first user equipment of claim 1, further configured to receive a capability report from the plurality of user equipment indicating whether a new SCI format is required.

6. The first user equipment of claim 1, further configured to send the resources to a second user equipment of the plurality of user equipment along with a transmission/reception indicator in a SCI.

7. The first user equipment of claim 6, further configured to send decoding information to the second user equipment.

8. The first user equipment of claim 1, wherein the first user equipment is a gNode-B.

9. The first user equipment of claim 1, wherein the signaling type is selected from assistance type information, scheduling type information, reserved, and combinations thereof, and wherein the assistance type information includes a type selected from one or more of a hidden node, exposed node, half duplex, or collision.

10. A method, implemented in a first user equipment, comprising:

sensing a plurality of user equipment in a group to provide sidelink coordination;

determining a coordination type for each of the plurality of user equipment, wherein the coordination type is scheduled and/or assisted;

obtaining transmission and reception resources for each of the plurality of user equipment;

determining the transmission and reception resources are dedicated or shared among the plurality of user equipment based on the coordination type; determining a signaling type for each of the plurality of user equipment based on the coordination type, wherein the signaling type includes different types of assistance information with different payload sizes;

determining whether a payload size for each of the plurality of user equipment, based on the determined signaling type, exceeds a predetermined threshold; and wherein the signaling type is carried in sidelink control information (SCI) in a physical sidelink shared channel when the payload size is less than the predetermined threshold and a priority rank of the signaling type is above a predetermined level.

11. The method of claim 10, wherein the transmission and reception resources are shared.

12. The method of claim 10, further comprising:

determining a priority of the plurality of user equipment based on the coordination type; and allocating a first subset of the transmission and reception resources to a first one of the plurality of user equipment, and allocate a second subset of the transmission and reception resources to a second one of the plurality of user equipment.

13. The method of claim 10, further comprising:

sending the resources to a second user equipment of the plurality of user equipment along with a transmission/reception indicator in a SCI.

14. The method of claim 13, configured to send decoding information to the second user equipment.

15. The method of claim 10, wherein the coordination type is scheduled for one of the plurality of user equipment and the coordination type is assisted for another one of the plurality of user equipment.

16. The method of claim 10, comprising receiving a capability report from the plurality of user equipment indicating whether a new SCI format is required.

17. The method of claim 10, wherein the first user equipment is a gNode-B.

18. The method of claim 10, wherein the signaling type is selected from assistance type information, scheduling type information, reserved, and combinations thereof, and wherein the assistance type information includes a type selected from one or more of a hidden node, exposed node, half duplex, or collision.

* * * * *